United States Patent
Takenaka

[19]
[11] Patent Number: 5,936,367
[45] Date of Patent: Aug. 10, 1999

[54] GAIT GENERATION SYSTEM OF LEGGED MOBILE ROBOT

[75] Inventor: Toru Takenaka, Saitama, Japan

[73] Assignee: Honda Giken Kogyo Kabushiki Kaisha, Tokyo, Japan

[21] Appl. No.: 09/017,652

[22] Filed: Feb. 2, 1998

[30] Foreign Application Priority Data

Jan. 31, 1997 [JP] Japan ................................. 9-033175

[51] Int. Cl.$^6$ ................................................ B62D 57/032
[52] U.S. Cl. ............................. 318/568.12; 318/568.2; 318/568.22; 180/8.6; 395/95; 901/1
[58] Field of Search ............................. 318/568.1, 568.11, 318/568.12, 568.2, 568.22; 901/1, 9, 27, 28, 48; 180/8.1, 8.2, 8.6; 395/95

[56] References Cited

U.S. PATENT DOCUMENTS

| | | | |
|---|---|---|---|
| 5,221,883 | 6/1993 | Takenaka et al. | 318/568.12 |
| 5,357,433 | 10/1994 | Takenaka et al. | 318/568.12 X |
| 5,402,050 | 3/1995 | Ozawa | 318/568.12 |
| 5,404,086 | 4/1995 | Takenaka et al. | 318/568.12 |
| 5,426,586 | 6/1995 | Ozawa | 318/568.12 X |
| 5,432,417 | 7/1995 | Takenaka et al. | 318/568.12 |
| 5,459,659 | 10/1995 | Takenaka | 318/568.12 |
| 5,513,106 | 4/1996 | Yoshino et al. | 318/568.12 X |
| 5,594,644 | 1/1997 | Hasegawa et al. | 364/424 |
| 5,808,433 | 9/1998 | Tagami et al. | 318/568.12 |
| 5,838,130 | 11/1998 | Ozawa | 318/568.2 |

FOREIGN PATENT DOCUMENTS

| | | |
|---|---|---|
| 62-97006 | 5/1987 | Japan . |
| 5-285868 | 11/1993 | Japan . |
| 5-318339 | 12/1993 | Japan . |
| 5-324115 | 12/1993 | Japan . |
| 8-214260 | 8/1996 | Japan . |
| 8-214261 | 8/1996 | Japan . |

*Primary Examiner*—Bentsu Ro
*Attorney, Agent, or Firm*—Lyon & Lyon LLP

[57] ABSTRACT

A gait generation system of a biped mobile robot having a body and two articulated legs each having a foot at its distal end connected by an ankle joint. The system has two or three models approximating a deviation of displacement (position) and velocity of the body and the ZMP indicative of the floor reaction force acting on the robot. In the system, two gaits for a robot walking step are generated. If there is a discontinuity of the body position or velocity or the ZMP in the gait boundary, the models are manipulated to cancel the discontinuity. The output of the models are calculated from the input, and based on the input and output, the gaits are corrected. The models are designed to stop at every two walking steps so as to avoid calculation errors from being accumulated.

48 Claims, 24 Drawing Sheets

STANDARD GAIT NO. 0

STANDARD GAIT NO. 1

STANDARD GAIT NO. 2

MODEL BEHAVIOR CHARACTERISTICS IN RESPONSE TO 1ST GAIT (CURRENT GAIT) ZMP BIAS

MODEL BEHAVIOR CHARACTERISTICS IN RESPONSE TO 2ND GAIT (CURRENT GAIT) ZMP BIAS

MODEL BEHAVIOR CHARACTERISTICS IN RESPONSE TO UNIT AMOUNT OF MODEL ZMP SHIFTING

GAIT GENERATION SYSTEM OF LEGGED MOBILE ROBOT

BACKGROUND OF THE INVENTION

1. Field of the Invention

The present invention relates to a system for and a method of generating a gait of a legged mobile robot, and more particularly to a system for and a method of freely generating or determining a gait which can effect a continuous robot walking or locomotion for a long period.

2. Description of the Related Art

In a conventional gait generation of a legged mobile robot, as taught in Japanese Laid-Open Patent Application No. Hei 5 (1993)-285,868, various gaits in time-series data including that for walking straight or that for turning are designed through experiment using a computer. The data is then loaded to a microcomputer mounted on the robot which processes the data successively during walking to compute commands to robot joint actuators so as to effect walking or locomotion. Moreover, Japanese Laid-Open Patent Application No. Sho 62 (1987)-97,006 proposes to prepare similar time-series data beforehand and to load the data to the on-board microcomputer which processes the data successively during walking. The second reference discloses interpolating the adjacent time-series data to shorten the time interval (i.e., increase the sampling rate).

Since, however, the time-series data has been prepared beforehand, the prior-art techniques fail to generate a gait freely on a real-time basis during walking such that the robot may change its stride or the angle of turning as desired.

In order to solve this drawback of the prior art, the assignee proposes in Japanese Patent Application No. Hei 8 (1996)-214,261, to generate a gait freely on a real-time basis such that the robot can walk at a desired stride or turn in a desired angle. The system generates, per walking step, gait parameters based on position (or displacement), velocity (or displacement velocity) and floor reaction force.

BRIEF SUMMARY OF THE INVENTION

An object of the present invention is to improve or develop the proposed technique and to provide a system for and a method of generating a gait of a legged mobile robot which generates a gate satisfying the dynamic equilibrium and whose trajectories are continuous at the gait boundary, taking gaits for a plurality of walking steps into account, in such a manner that more smooth and continuous robot walking is effected.

A second object of the present invention is to provide a system for and a method of generating a gait of a legged mobile robot which generates a gait satisfying the dynamic equilibrium, while preventing calculation errors from being accumulated, such that smooth and continuous robot walking is ensured.

In order to achieve the object, there is provided a system for generating a gait of a legged mobile robot having at least a body and a plurality of articulated legs each connected to the body through a joint, comprising gait generating means for generating at least two gaits having at least a parameter relating to a displacement of the body and a parameter relating to a floor reaction force acting on the robot, discontinuity amount calculating means for calculating an amount of discontinuity of the displacement and a velocity of the body and the floor reaction force at a boundary of the generated gaits, model input determining means for determining an input to a model designed to approximate a deviation or perturbation of the displacement and velocity of the body relative to the floor reaction force in response to the amount of discontinuity such that the model behaves to cancel the amount of discontinuity, model output determining means for determining an output from the model in response to the input to the model, gait correcting means for correcting at least one of the gaits in response to the input to the model and the output from the model, and joint angle command determining means for determining angle commands of the first and second joints in response to the corrected gaits.

BRIEF DESCRIPTION OF THE DRAWINGS

These and other objects and advantages of the invention will be more apparent from the following description and drawings, in which.

DETAILED DESCRIPTION OF THE PREFERRED EMBODIMENTS

Embodiments of the invention will now be explained taking a biped mobile robot as the example of the legged mobile robot.

Figure 1:
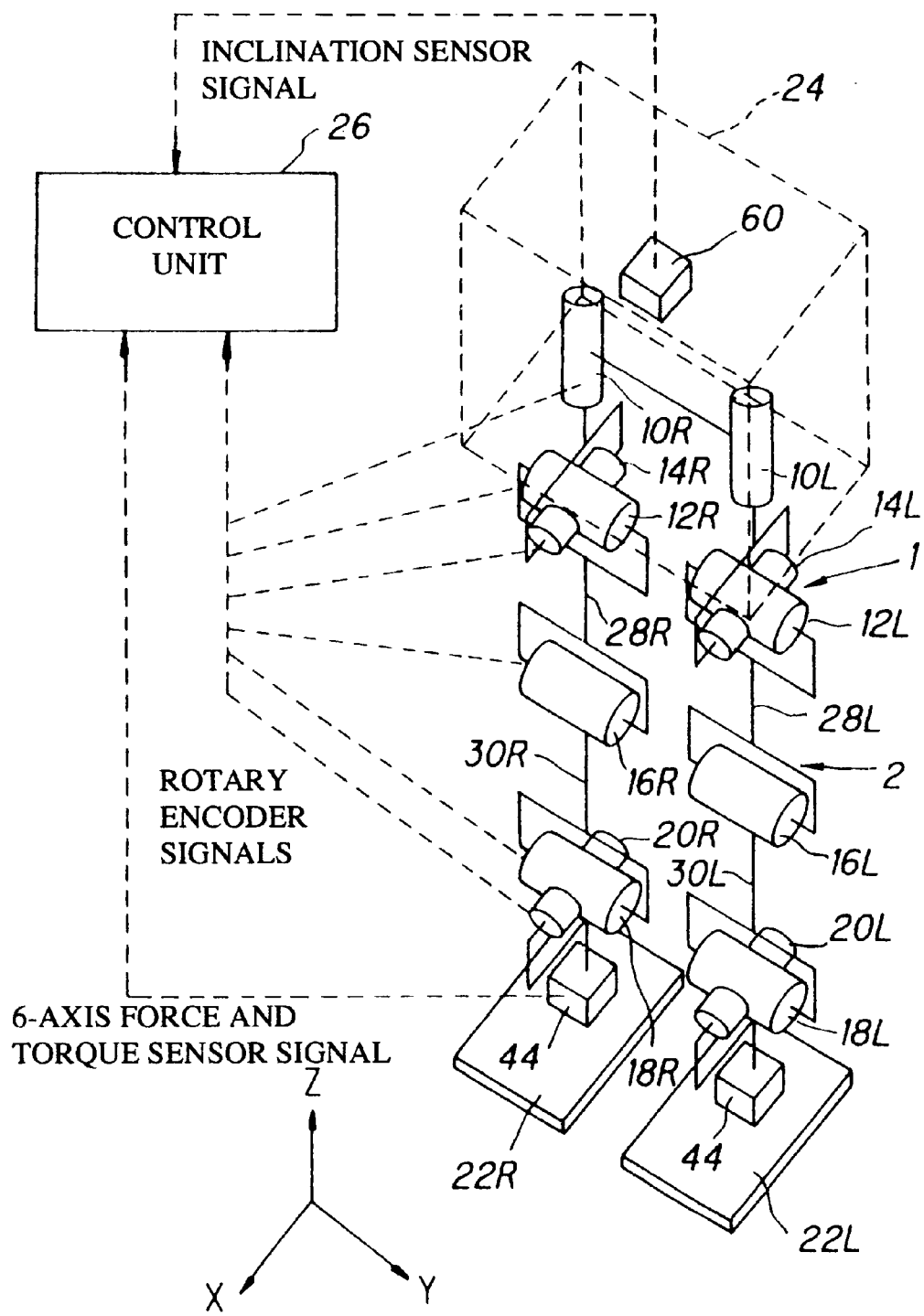
FIG. 1 is a schematic view showing an overall configuration of a gait generation system of a legged mobile robot according to the present invention.

FIG. 1 is an overall schematic view showing the system for generating a gait of a legged mobile robot according to the present invention.

As illustrated in the figure, the robot 1 has a pair of laterally spaced articulated legs (leg links) 2 each composed of six joints. For an easier understanding, each of the joints is represented by an electric motor which actuates the joint.

The joints include, arranged successively downward, a pair of joints 10R, 10L (the right-hand joint is indicated by R and the left-hand joint by L) for rotating legs with respect to a hip, a pair of joints 12R, 12L for pitching movement with respect to the hip about a Y-axis within a sagittal plane, a pair of joints 14R, 14L for rolling movement with respect to the hip about an X-axis within a frontal plane, a pair of knee joints 16R, 16L for pitching movement with respect to knees, a pair of joints 18R, 18L for pitching movement with respect to feet 22R(L), and a pair of joints 20R(L) for rolling movement with respect to feet 22R(L).

The robot 1 has a body (trunk) 24 as its uppermost portion which houses therein a control unit 26 comprising microcomputers which will be described later with reference to FIG. 2. The joints 10R(L), 12R(L), 14R(L) make up hip joints, and the joints 18R(L), 20R(L) make up ankle joints. The hip joints and knee joints are connected to each other by thigh links 28R, 28L, and the knee joints and ankle joints are connected to each other by crus or shank links 30R, 30L. With the above structure, each of the legs 2 is given six degrees of freedom. When the 6×2=12 joints are driven to suitable angles while the robot 1 is walking, a desired motion is imparted to the entire leg structure to cause the two-legged walking robot 1 to walk arbitrarily in a three-dimensional environment including stairs.

It should be noted that, throughout the description, the position (displacement) and (displacement) velocity of the body 24 is used to mean those of a representative position such as the position of the center of gravity of the body 24 and (displacement) velocity thereof.

A known six-axis force and torque sensor 44 is disposed below the ankle joint 18, 20R(L) for measuring three directional components Fx, Fy, Fz of force and three directional components Mx, My, Mz of torque or moment thereby to detect whether the foot 22R(L) has landed or not, or if a load or force is acting on the robot through the foot assembly when it contacts the floor. The body 24 has an inclination sensor 60 for detecting tipping or inclination in the frontal plane with respect to a Z-axis (the direction of gravity) and its angular velocity, and also a tilt in the sagittal plane with respect to the Z-axis and its angular velocity. The electric motors of the respective joints are coupled with respective rotary encoders for detecting angular displacements of the electric motors, and thereby the joint angles.

Although not shown in FIG. 1, the robot 1 is configured to have a joystick at an appropriate position thereof, through which an operator can input a demand for the gait to change to another gait such as making the robot, when walking straight, to turn. It is alternatively possible to provide, instead of the joystick, a remote control system or communication system for the same purpose.

Figure 2:
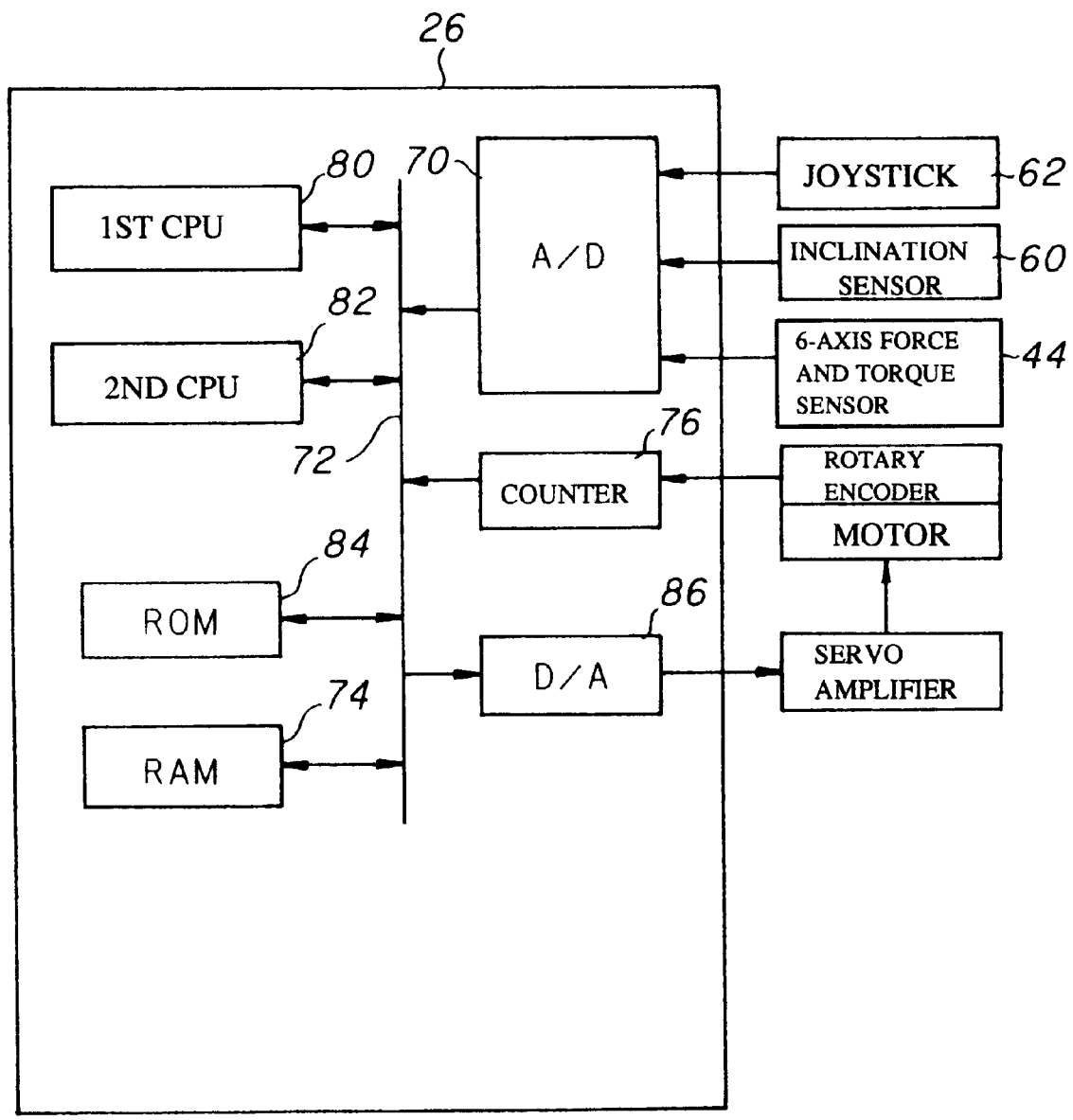
FIG. 2 is a block diagram showing details of the hardware configuration of a control unit illustrated in FIG. 1.

FIG. 2 is a block diagram which shows the details of the control unit 26, which is comprised of microcomputers. Output signals from the sensors 44 and the inclination sensor 60 as well as the joystick (assigned with reference numeral 62 in the figure) are converted by an A/D converter 70 into digital signals, which are transmitted through a bus 72 to a RAM 74. Output signals from the rotary encoders that are disposed adjacent to the respective electric motors are transmitted through a counter 76 to the RAM 74.

The control unit 26 includes first and second CPUs 80, 82. The first CPU 80 generates a gait freely on a real-time basis during walking using standard gaits prepared beforehand and stored in a ROM 84, calculates commands for the joint angles based on the generated gait, and outputs the commands to the RAM 74. The second CPU 82 reads the commands and detected values from the RAM 74, and outputs manipulated variables through a D/A converter 86 and servo-amplifiers to the electric motors provided at the respective joints.

Figure 3:
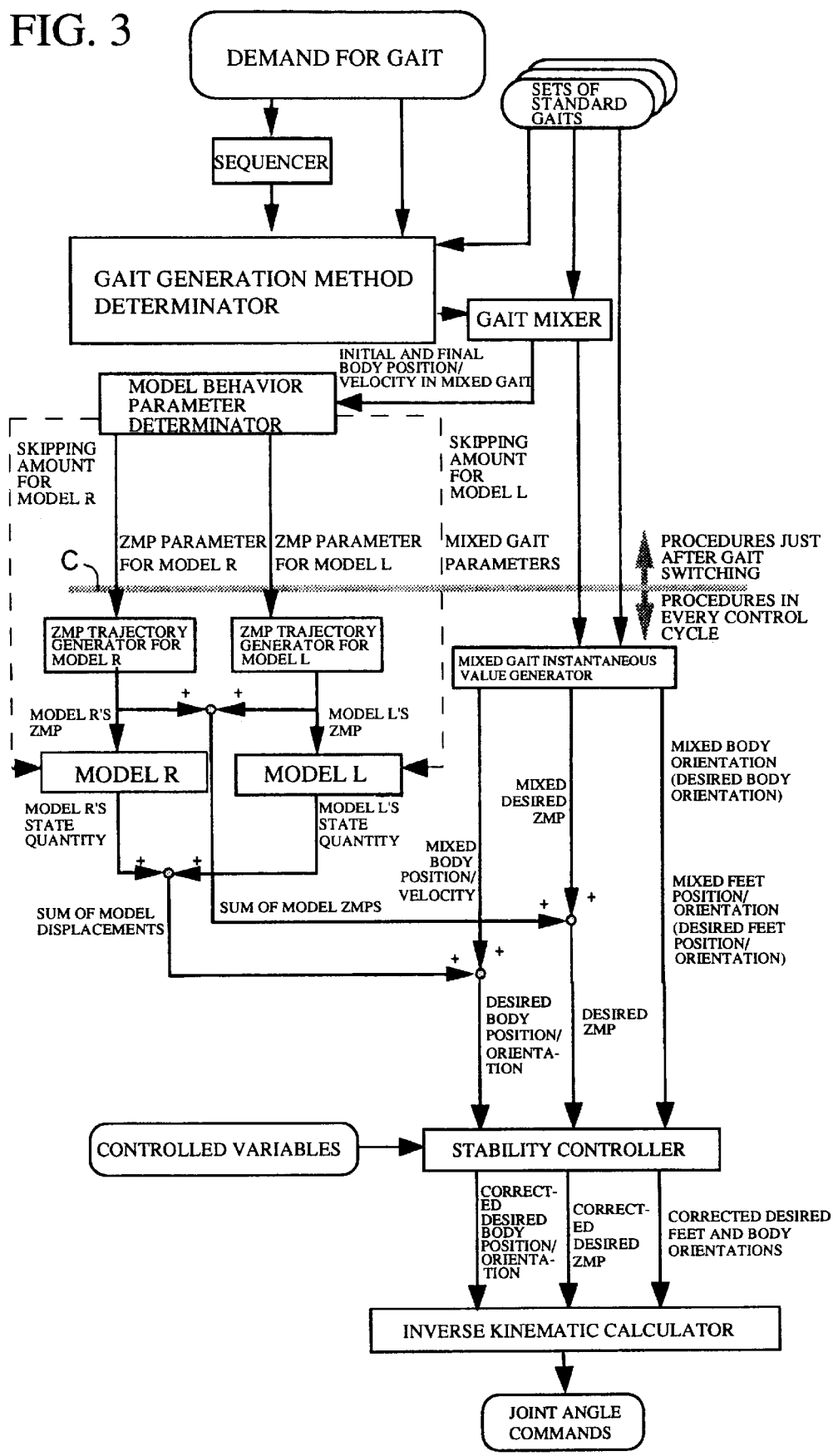
FIG. 3 is a block diagram showing the configuration, in a software manner, of the control unit, more specifically the gait generation system according to the present invention.

FIG. 3 is a block diagram which shows the configuration and mode of operation of the system according to the present invention in a software manner.

For ease of understanding, the gait generation proposed in the earlier application (Hei 8 (1996)-214,261) is described briefly.

The earlier-proposed technique is based on the compliance control mentioned in another application proposed by the assignee which was patented in the United States under the U.S. Pat. No. 5,432,417.

In the compliance control, the error between a desired position and the detected position of the central point of the floor reaction force acting on the robot is first determined, and either or both of the legs are moved to decrease the error, thereby effecting control of posture stability. When the robot is about to tip over, the desired floor reaction force position is intentionally moved or shifted so as to restore robot posture stability. The earlier-proposed application (Hei 8 (1996)-214,261) aimed to generate a gait necessary for conducting the robot posture stabilization using such a kind of compliance control.

In robot locomotion control, it is impossible to ensure stable walking or locomotion unless the relationships among the desired motion trajectories and the desired floor reaction force pattern satisfy the dynamic equilibrium condition. To satisfy the dynamic equilibrium condition means, to be more specific, that the central point of the desired floor reaction force (the point of action on the floor at which the secondary moment of the desired floor reaction force becomes zero) is equal to the Zero Moment Point (the point on the floor at which the moment of the resultant force of the inertial force due to motion and gravity is zero except for its vertical component; referred to hereinafter simply as ZMP). If they do not accord with each other, the robot loses the dynamic equilibrium between the resultant force and the floor reaction force and will tip over or rotate.

In the compliance control proposed earlier, this rotation is deliberately utilized to restore stability when the robot is about to tip or turn over. At any rate, the robot gait should include not only the desired motion patterns or trajectories, but also the desired floor reaction force patterns which satisfy the dynamic equilibrium condition relative to the desired motion patterns. The desired floor reaction force is generally described by a force and moment, and by its point of action. Since the point of action can be set at a given point, the desired floor reaction force has numerous descriptions. However, if it is described by taking the aforesaid central point of the desired floor reaction force as the point of the action, the moment, at the point, of the resultant force of the inertial force due to motion and gravity is zero except for its vertical component.

As stated before, since the trajectory of the central point of the desired floor reaction force which satisfies the dynamic equilibrium condition relative to the desired motion patterns or trajectories is equal to the ZMP, the desired ZMP trajectory can instead be used. Therefore, the above can be rewritten as "the robot gait should include not only the desired motion patterns or trajectories, but also the desired ZMP pattern or trajectory (i.e., the pattern or trajectory of the central point of the desired floor reaction force)".

Thus, the desired gait can be defined, in a broad sense, as a set of the desired motion trajectories and the desired floor reaction force pattern for a period corresponding to a walking step or steps. In a narrower sense, the desired gate can be defined as a set of the desired motion trajectories and the ZMP trajectory for a period corresponding to a single waking step (e.g., beginning from the start of a double-leg supporting phase to the end of a single-leg supporting phase). In this sense, walking is comprised of a series of gaits. Here, the double-leg supporting phase means a period during which the robot 1 supports its weight with two legs 2, whereas the single-leg supporting phase means a period during which the robot supports its weight with one of the two legs 2. The leg which does not support the robot weight during the single-leg supporting phase is called the free leg.

The desired gait should satisfy the following conditions.

Condition 1) The desired gait must satisfy the dynamic equilibrium condition. In other words, the ZMP trajectory calculated dynamically in response to the desired motion trajectories of the robot 1 should be equal to the desired ZMP trajectory (i.e., the trajectory of the central point of the desired floor reaction force).

Condition 2) When a demand(s) such as a change in stride or in the angle of turning is made by a locomotion planner or path planner (neither shown) of the robot 1 or by an operator through the joystick 62, the desired gait should satisfy such a demand(s).

Condition 3) The desired gait should satisfy conditions of constraint in kinematics such as that the robot foot must not dig or scrape the floor on which it walks, the joint angle must be within the movable range, and the joint angular velocity must not exceed the permissible range.

Condition 4) The desired gait should also satisfy conditions of constraint in dynamics such as the ZMP having to remain within the foot sole floor-contact area during the single-leg supporting phase, and that the joint torque must not exceed the possible maximum power of the joint actuators.

Condition 5) The desired gait should satisfy conditions of boundary. As a matter of course, condition 1 results in the condition of boundary that the position and velocity of robot portions such as the body must be continuous in the gait boundary. (If not, infinite force would occur or the ZMP would move far from the foot sole floor-contact area).

More specifically, the final state of n-th gait should correspond to the initial state of n+1-th gait, especially in the body position, orientation and velocity relative to the feet position and orientation.

As will be explained later, the desired gait is generated in this embodiment by a gait generation algorithm including parameters or time-series tabulated data. However, if the parameters or time-series tabulated data are determined without paying careful attention, it is not certain whether the generated gait can satisfy all of conditions 1) to 5) mentioned above. In particular, when generating the body trajectories satisfying condition 1) based on the ZMP trajectory, even when ranges of the body position and velocity at the gait end are known, it is quite difficult to determine the ZMP trajectory such that the body position and velocity will both be within the range at the gait end.

The reasons of the difficulty are as follows.

Reason 1) The robot body tends to move farther from the ZMP, once initially moved away from the ZMP. This will be explained using an inverted pendulum model, shown in FIG. 4. The model approximates the behavior of the robot body 24.

If the inverted pendulum's supporting point 22a deviates from the projection point of the central point of the center of the gravity of the pendulum on the floor, the center of the gravity tends to move and moves farther therefrom. The deviation thus tends to increase, and the pendulum turns over. Even when the pendulum is turning over, the resultant force of the inertial force and gravity of the inverted pendulum is acting on the supporting point 22a (in other words, the ZMP is kept equal to the supporting point 22a), and the resultant force is kept balanced with the floor reaction force acting through the supporting point 22a. The dynamic equilibrium condition can only describe an instantaneous relationship between the inertial force and gravity and the floor reaction force of a moving object.

It is a frequent misconception that continuous robot walking can be ensured if the dynamic equilibrium condition is satisfied. However, satisfaction of the dynamic equilibrium condition will not ensure stable robot walking. Just as the center of gravity of the inverted pendulum tends to move farther, if moved from the position immediately above the supporting point, the center of gravity of the robot tends to move, if moved from the position immediately above the ZMP, move farther therefrom.

Reason 2) The single-leg supporting phase requires that the ZMP must be within the supporting leg foot sole floor-contact area. Due to rigid conditions of constraint such as this, it is difficult to determine the desired body patterns. If the body patterns are determined mainly taking body position into account, the velocity would tend to be out of range at the gait end, and vice versa.

Thus, it has hitherto been difficult to generate or determine the desired gait parameters or tabulated data, on a real-time basis, which will satisfy all of the possible gait conditions. The aforesaid prior art techniques described in the references could not effect free robot walking. Therefore the assignee proposed the gait generation technique in the earlier application (Hei 8 (1996)-214,261).

When generating a new desired gait to be connected with another previously generated desired gate (hereinafter referred to as "desired gait 1"), the position (displacement) and velocity of the body and feet must be continuous at the boundary of the two gaits. In the gait generation proposed earlier, a new desired gait (hereinafter referred to as "desired gait 2") is generated in the following manner.

Firstly, putting aside the conditions concerning the body position and velocity at the boundary with the desired gait 1, the desired gait 2 is generated by mixing predetermined standard gaits prepared and stored beforehand such that the desired gait 2 satisfies the gait demand(s). Then, the mixed gait is added with additional ZMP and body position patterns (which satisfy the dynamic equilibrium conditions) obtained by using the inverted pendulum model shown in FIG. 4, so as to generate the desired gait 2 which satisfies the conditions at the boundary with the desired gait 1. In this specification, the terms "mixing" means to generate a gait (which satisfies demands except for the conditions of boundary) from a gait or gaits, and "mixed gait" means the gait thus generated.

However, in the gait generation proposed earlier by the assignee, even when the demanded initial body position and velocity deviate greatly from those in the mixed gait, the body patterns are forcibly corrected to satisfy the boundary conditions. As a result, there was a disadvantage that the magnitude of the corrected ZMP pattern sometimes became excessive, failing to satisfy the constraint conditions that, for example, the ZMP must be within the foot sole floor-contact area during the single-leg supporting phase. If the magnitude of the corrected ZMP pattern was made smaller so as to avoid such a disadvantage, the body patterns satisfying the dynamic equilibrium condition would be degraded, resulting in another problem in that the final body position and velocity would exceed the ranges appropriate for ensuring continuous stable walking. If this situation is left unchanged, the body position would deviate largely, rendering the posture unstable and causing difficulty for the robot while walking. Thus, forcibly adjusting for the conditions of boundary of one gait to the other in the gait generation proposed earlier was insufficient.

In order to solve the problem, the present invention determines the ZMP pattern and the body patterns, taking a plurality of gaits, more specifically, the gaits in two walking steps into account.

Figure 5:
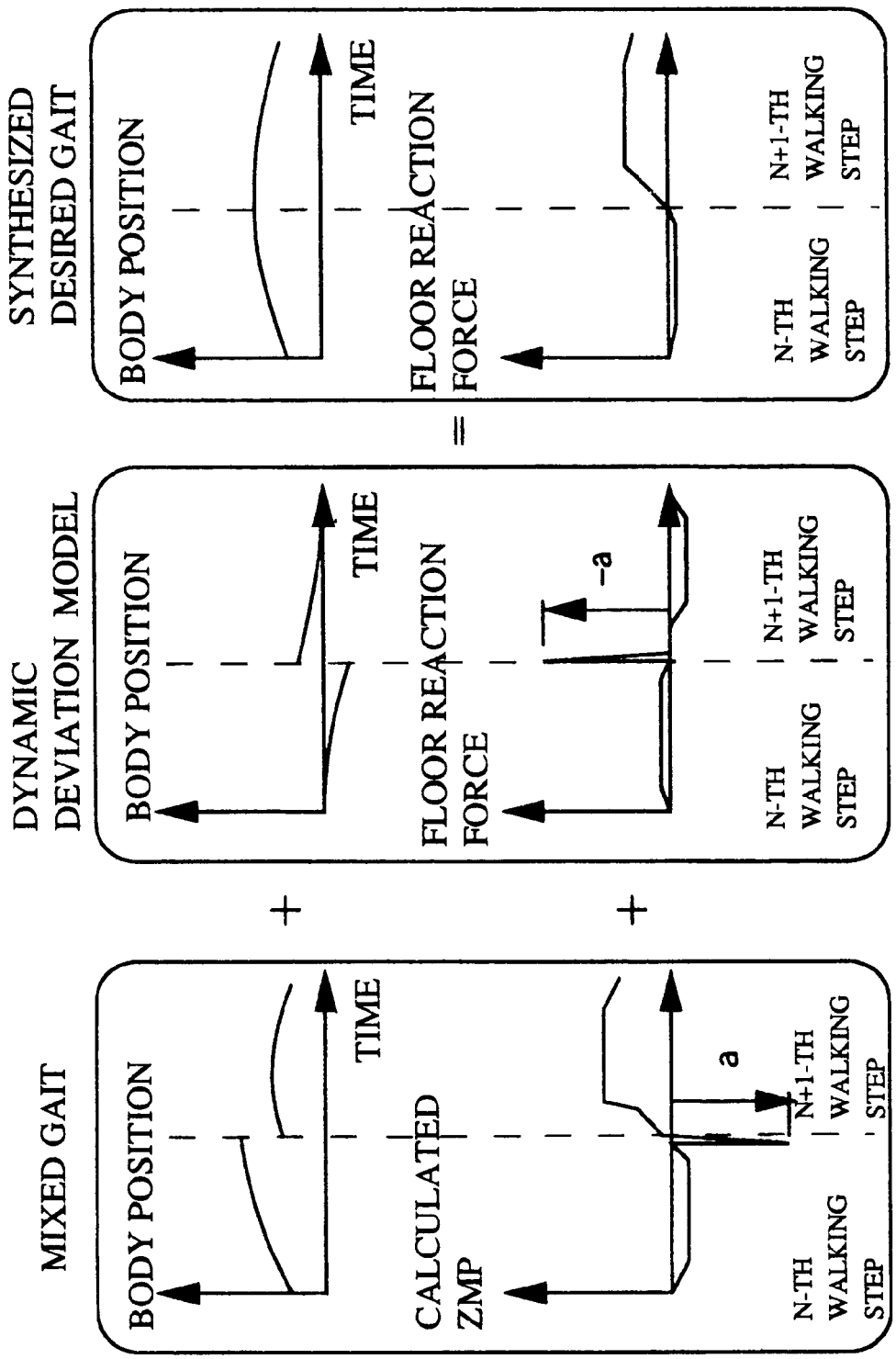
FIG. 5 is composed of time charts showing the gait discontinuity that occurs during the gait generation and the technique to solve the problem used in the system according to the present invention.

In the gait generation proposed earlier, as illustrated in the left hand side of FIG. 5, when two gaits are mixed to generate a new desired gait, since the body position (and velocity) in the mixed gait are discontinuous at the boundary of the walking step, the ZMP (dynamically calculated from the body motion) shifts or moves to an infinite point a.

The inventor contemplated the problem and has found that, as illustrated in the center of FIG. 5, if the model body position and velocity (i.e., the position and its displacement velocity of the center of gravity of the pendulum) are intentionally made discontinuous in the direction opposite to those in the mixed gait at the boundary, the model ZMP shifts, in that instant, in the direction opposite to that in the mixed gait by the same amount (−a) such that the overall ZMP shifting can be canceled. More specifically, it has been found that, if the ZMP obtained in the dynamic deviation model is added to the ZMP satisfying the dynamic equilibrium condition relative to the motion of the mixed gait, as illustrated in the right of FIG. 5, the body position (and velocity) become continuous in the synthesized desired gait. The ZMP's instantaneous shifting can thus be avoided in the synthesized desired gait. In conclusion, unless the robot model used in generating a gait differs greatly from the dynamic deviation model, the ZMP satisfying the dynamic equilibrium condition relative to the motion of the mixed gait and the dynamic deviation model ZMP acts to cancel one another.

The present invention is made based on the above finding.

Figure 6:
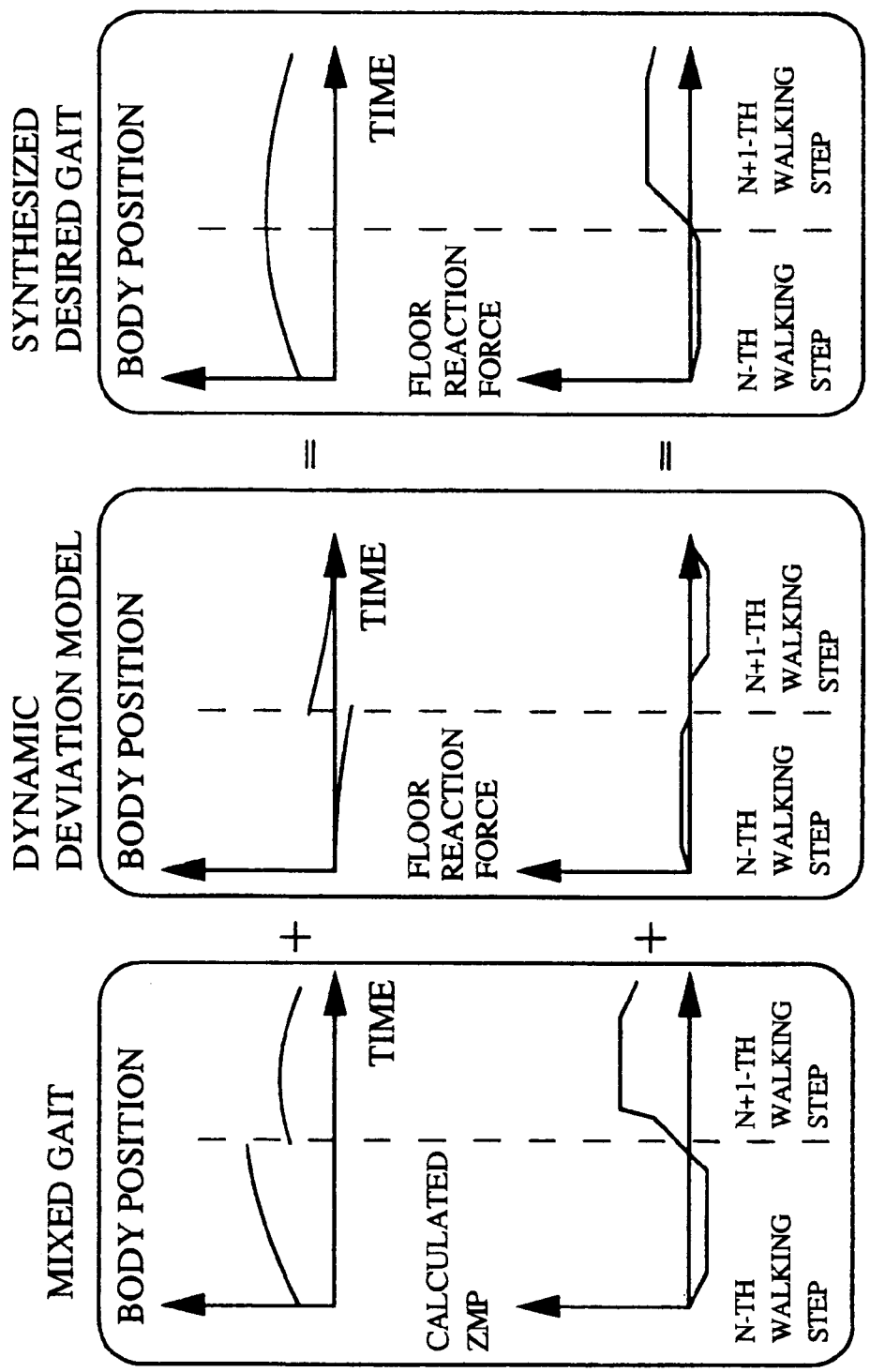
FIG. 6 is composed of time charts, similar to FIG. 5, but showing that the problem is easily solved by the technique used in the system according to the invention, without consideration of the ZMP shifting.

The ZMP in the mixed gait is calculated from predetermined ZMP parameters during robot walking. The ZMP calculated from the predetermined ZMP parameters is inherently continuous in the gait boundary. Accordingly, in determining a desired ZMP from the ZMP in the mixed gait (calculated from the predetermined ZMP parameters) and the model ZMP (calculated from the behavior of the model), the influence of the model on the ZMP caused by making the model position and velocity discontinuous at the gait boundary, need not be zero. In other words, it is not necessary to estimate how much the ZMP shifts in response to the discontinuity. It suffices, as illustrated in FIG. 6, if the body position and velocity in the model are varied discontinuously such that the discontinuity at the gait boundary in the mixed gait is canceled.

Figure 4:
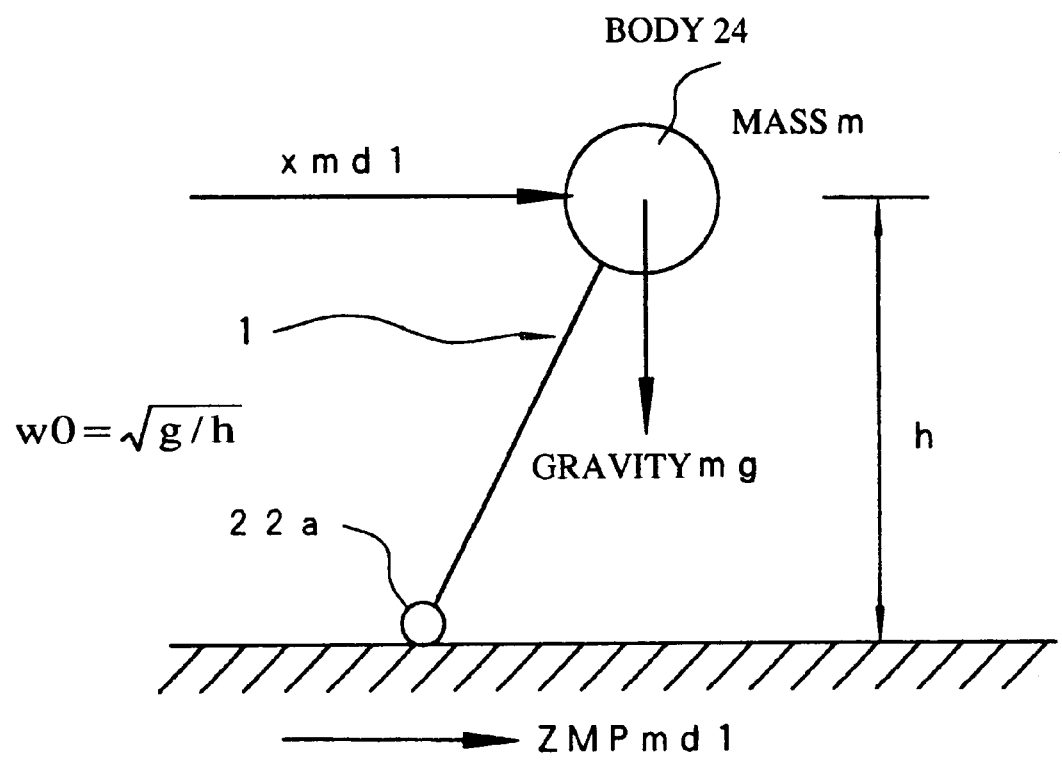
FIG. 4 is an explanatory view showing a dynamic deviation model approximating the behavior of the robot that is used in the system according to the present invention.

The dynamic deviation model shown FIG. 4 is explained.

The inverted pendulum model represents or describes the deviation or perturbation of the body position and velocity relative to the deviation of the ZMP. The model was used in the earlier application and is again used in the present invention. Assuming that the mass of the body 24 of the robot 1 is sufficiently larger than those of the other robot parts, and that the body acceleration in the direction of gravity during walking is small, the deviation of the body position and velocity relative to the ZMP deviation can be approximated by a linear inverted pendulum having a movable supporting point 22a, and is expressed as follows.

dxmdl/dt=v
dvmdl/dt=ω0²×(xmdl−ZMPmdl).

Here, xmdl: the position (in the X-direction) of the center of gravity of the linear inverted pendulum; vmdl: the velocity of the center of gravity of the linear inverted pendulum; ω0: a positive constant value and is defined with respect to the height of the center of gravity h and the gravitational acceleration g as;

$$\omega 0 = \sqrt{(g/h)}.$$

Since the robot is approximated by the linear inverted pendulum, it becomes possible to decrease the amount of calculation. In the above, ZMPmdl means the ZMP of the model.

The system according to the present invention uses the same dynamic deviation model as was used in the earlier application. In the system, two mixed gaits are generated without paying attention to the continuity in the body position and velocity and desired ZMP at the gait boundary, and when a discontinuity in position or velocity occurs in the generated mixed gaits in the X-direction or Y-direction, the model is manipulated such that the model body position or velocity is skipped by the amount Xs, Vs, or the model ZMP is continuously and gradually shifted by the amount Ds so as to solve the discontinuity in the body position and velocity at the gait boundary.

At this point, terms used hereinafter will be defined.

One of the two mixed gaits earlier in time is named "1st gait", while the other "2nd gait". The first and second gaits are conceptual terms when discussing the behavior of the dynamic deviation model. Moreover, "1st mixed gait" and "2nd mixed gait" are sometimes used, wherein the former indicates a mixed gait to be used in generating the 1st gait, while the 2nd mixed gait indicates that used in generating the second gait.

The aforesaid discontinuity in the mixed gait boundary is named "the amount of discontinuity", more specifically, the amount of position discontinuity Xm, the amount of velocity discontinuity Vm and the amount of ZMP discontinuity Dm. The intentional amount of skipping or shifting to be applied is called "the amount of skipping" as mentioned before, more specifically, the amount of model position skipping Xs, the amount of model velocity skipping Vs, and the amount of model ZMP shifting Ds.

The amount of model ZMP shifting Ds is determined in response to the amount of ZMP discontinuity Dm, which, in turn is the error between the demand value of the initial free leg position of the 2nd gait and the initial free leg position of the mixed gait. If the error is zero, the mixed gait is generated such that its ZMP is continuous. When the initial free leg position of the mixed gait is changed in order to change a walking stride or pitch, however, the error will not be zero, rendering the mixed gait ZMP discontinuous. The amount of model ZMP shifting Ds is determined to cancel the error.

These amounts of skipping and shifting are determined as follows.

Xs=−Xm
Vs=−Vm
Ds=−Dm

Figure 7:
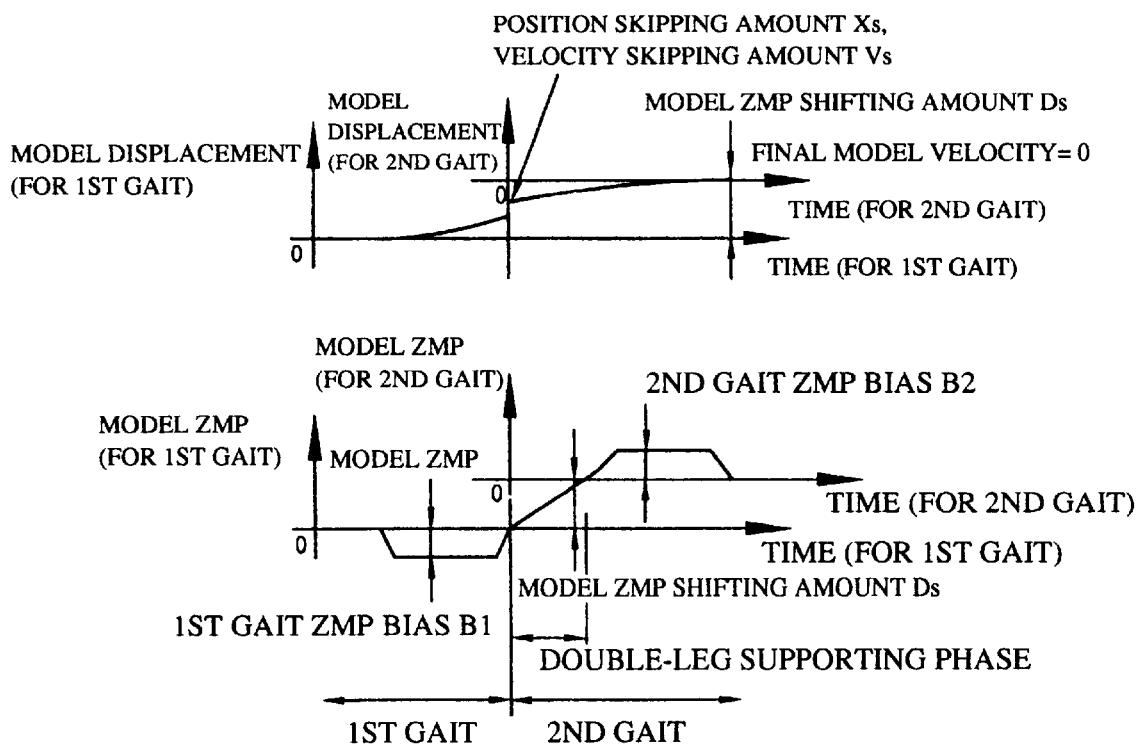
FIG. 7 is composed of time charts more specifically showing the technique used in the system.

As illustrated in FIG. 7, the ZMP pattern to be applied to the model is in a trapezoidal shape. The height of trapezoid is named "bias", i.e., for the 1st gait "1st gait ZMP bias B1", and for the 2nd gait; "2nd gait ZMP bias B2". These biases B1, B2 indicate a steady deviation or perturbation of ZMP in the 1st and 2nd gaits. In the description and figures, the position, the velocity and ZMP are referred to only in the X-direction (X-axis), but the same will also be applied to the Y-direction (Y-axis).

The origin of the coordinate system of the model ZMP is set at the supporting leg foot sole floor-contacting surface. The origin of the coordinate system of the 1st gait is therefore different from that of the 2nd gait. The model ZMP will be continuous if kept to view from the 1st gait coordinate system. The 1st gait final model ZMP is zero when viewed from the 1st gait coordinate system, but the 2nd gait initial model ZMP viewed from the 2nd gait coordinate system is −Ds. When replacing the initial free leg position of the 2nd mixed gait with a demand value, the initial position of ZMP of the 2nd gait (which is at the toe) is shifted from the toe by −Dm. Accordingly, by adding the model ZMP position (viewed from the 2nd gait coordinate system) to the 2nd mixed gait, the initial ZMP of the 2nd gait will be positioned appropriately at the toe (i.e., the position shifted from the toe by the amount −Ds−Dm (=0)).

The calculation error in the model will now be explained.

Figure 8:
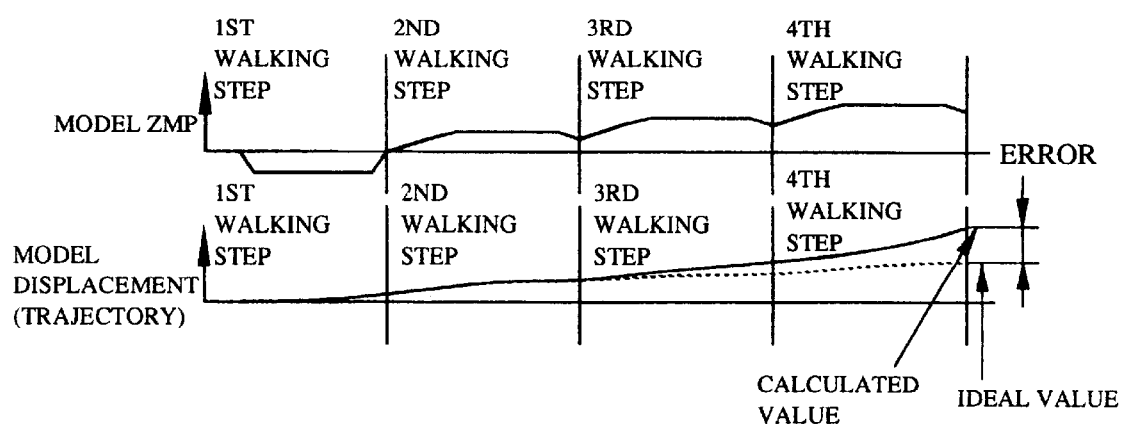
FIG. 8 is a time chart showing an accumulation of calculation errors when calculating the behavior of the model shown in FIG. 4.

When calculation of the behavior of the model relative to the model ZMP pattern is continued over a long period, as illustrated in FIG. 8, calculation errors, i.e., errors in displacement will be accumulated. Since the model is normally an unstable system, if errors are accumulated it will make the system oscillate. For example, if the model behavior calculation is continued over ten seconds, the model calculation errors accumulated may exced 1 degree. In order to achieve a long period of continuous walking, the errors must not be accumulated. For that purpose, a plurality of models are prepared in this system, and each model is arranged to take a predetermined posture such as standing upright and stopping at a predetermined period or time such as the final walking period such that the model displacement is equal to the manipulated variable of the ZMP.

Figure 9:
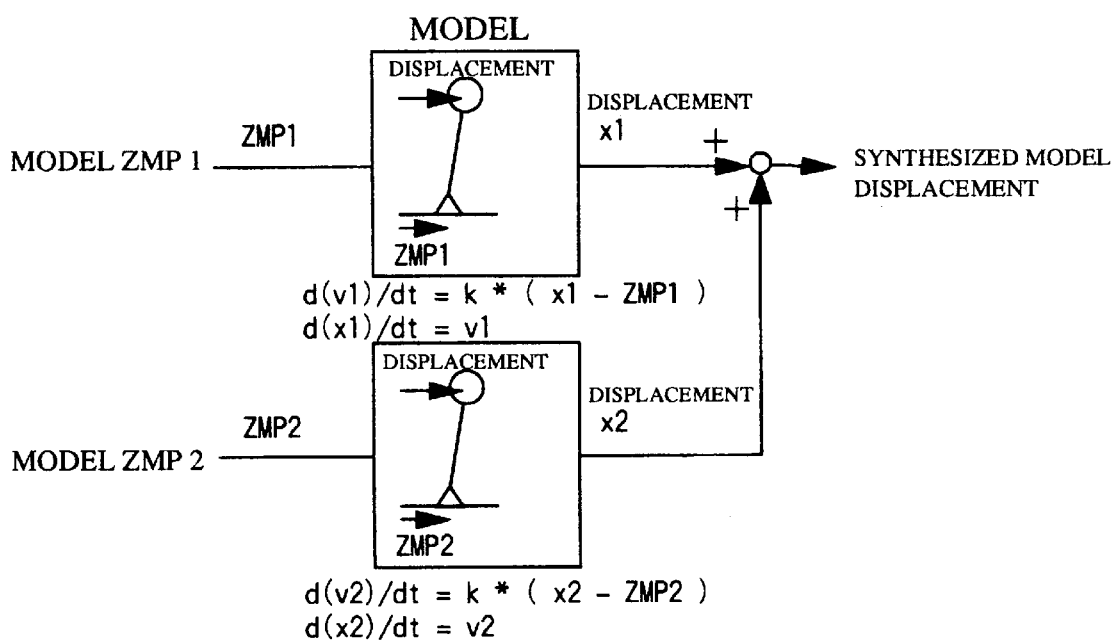
FIG. 9 is an explanatory view showing the configuration of the system according to the present invention in which two examples of the model illustrated in FIG. 4 are provided to prevent the calculation errors from being accumulated.
Figure 10:
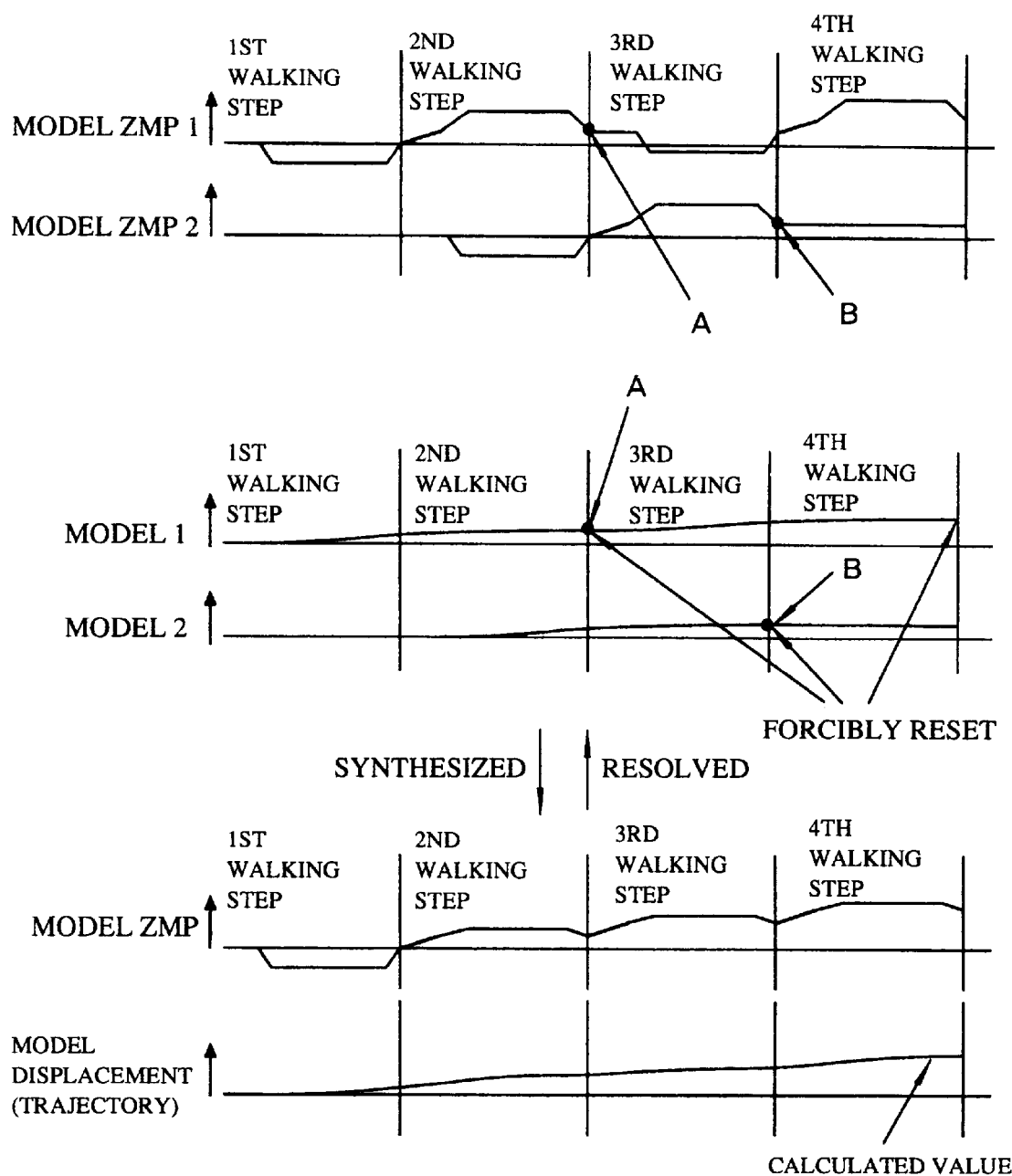
FIG. 10 is composed of time charts showing the behavior of the two models illustrated in FIG. 9 to prevent the calculation errors from being accumulated.
Figure 11:
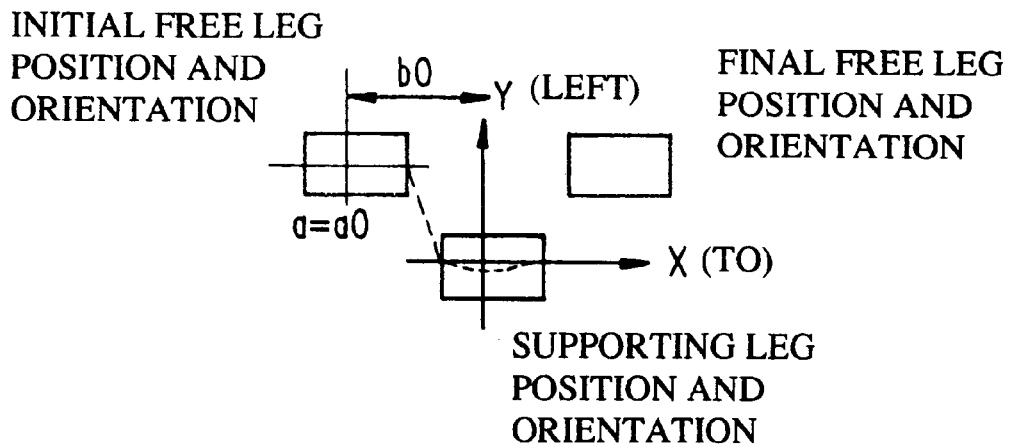
FIG. 11 is an explanatory plan view showing the position and orientation of the robot feet in standard gait No. 0 among the standard gaits used in the system according to the present invention.
Figure 12:
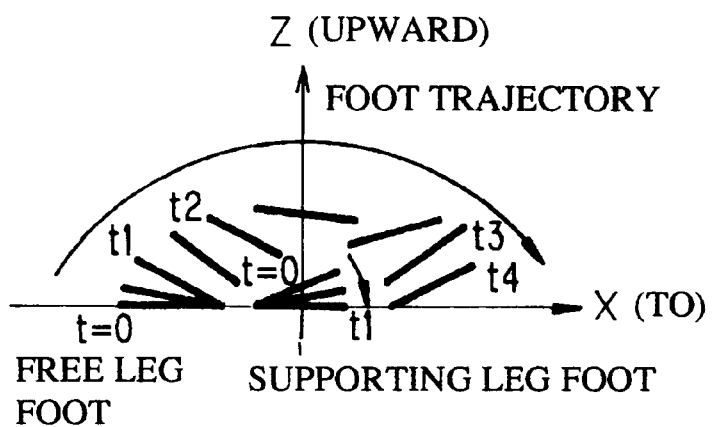
FIG. 12 is an explanatory side view showing the trajectory of the feet in standard gait No. 0 illustrated in FIG. 11.

More specifically, the present invention is provided with two models as illustrated in FIG. 9. As illustrated in FIG. 10, the models are applied with the model ZMP pattern such that each model stands upright and stops once every two walking steps. After walking two steps, the model is forcibly reset to zero, more precisely, the model velocity is set to be zero in such a manner that its displacement becomes equal to the model ZMP. As shown in FIG. 10, the first model velocity is made zero at point A, while the second model velocity is made zero at point B. Thus, although each individual model behavior and its calculation is reset at every second walking step, synthesized model behavior is continuous as shown in the bottom of FIG. 10, and the calculation errors will only be accumulated over the brief period. The model ZMP pattern relative to the synthesized model behavior can easily be generated by summing the ZMP patterns of the respective models.

Based on the above, the operation of the system according to the present invention will be explained with reference to FIG. 3. In the figure, the operations illustrated above the line C are executed at the beginning of walking or once per waking step, while those illustrated below the line C are executed once per control cycle, e.g. every 20 milliseconds, at which the program is looped.

In the system illustrated, a set or group of standard gaits are provided similar to the system in the earlier application. The standard gaits have been generated on a computer (other than the first CPU 80 in the control unit 26) in such a manner that they ensure a long continuous period of walking up to the final step, without causing the robot body trajectory to diverge. The standard gaits which ensure a long continuous period of walking are typically comprised of a series of gaits having a gait to start walking from a standing position, a gait for accelerating the walking speed, a gait for constant speed walking, a gait for decelerating the walking speed, and a gait to stop walking.

Figure 13:
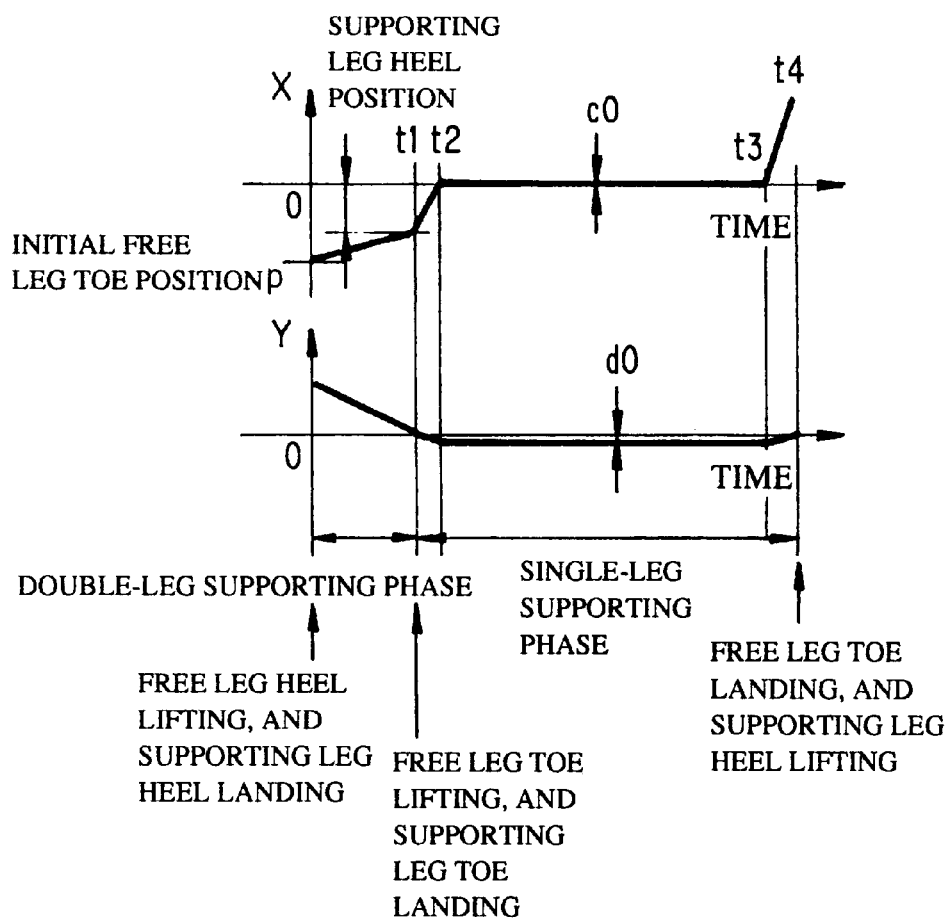
FIG. 13 is a time chart showing the trajectory of the ZMP (Zero Moment Point) in the X-direction in standard gait No. 0 illustrated in FIG. 11.
Figure 14:
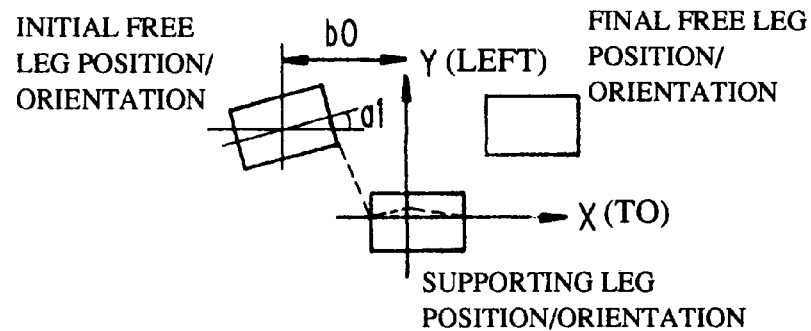
FIG. 14 is an explanatory plan view showing the position and orientation of the feet in standard gait No. 1 among the standard gaits used in the system according to the present invention.
Figure 15:
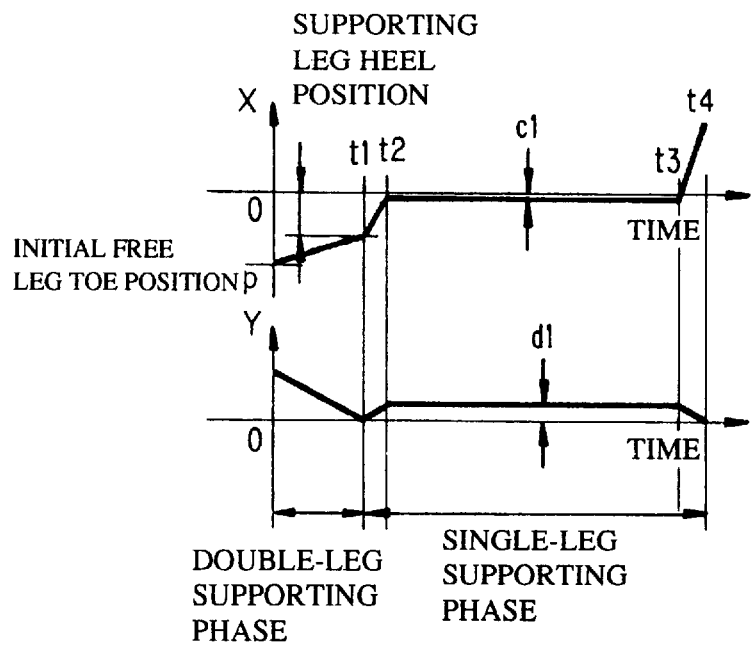
FIG. 15 is a time chart showing the trajectory of the ZMP in the X-direction in standard gait No. 1 illustrated in FIG. 14.
Figure 16:
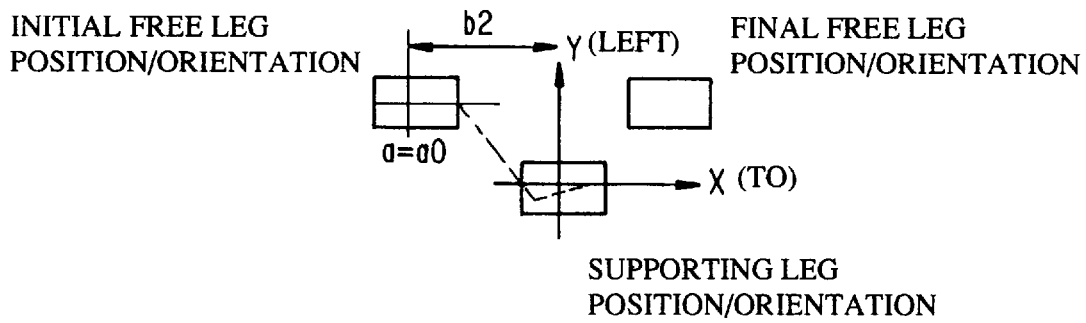
FIG. 16 is an explanatory plan view showing the position and orientation of the feet in standard gait No. 2 among the standard gaits used in the system according to the present invention.
Figure 17:
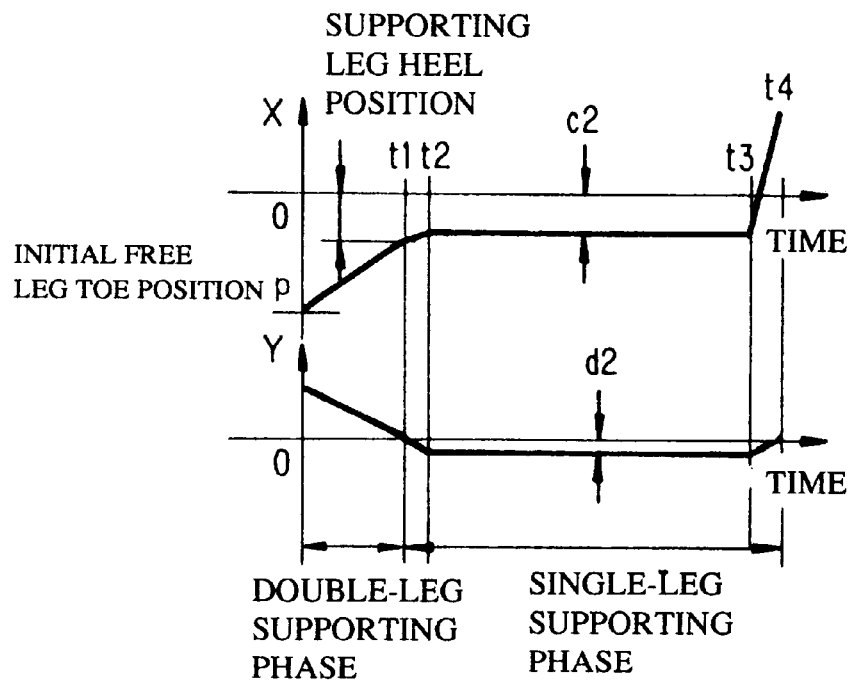
FIG. 17 is a time chart showing the trajectory of the ZMP in the X-direction in standard gait No. 2 illustrated in FIG. 16.

The gait is described by gait parameters. The gait parameters are comprised of motion parameters and the ZMP parameter (more generally floor reaction force parameter). The floor reaction force parameter is used in this specification to mean a parameter relating to the floor reaction force pattern as a function of time. The ZMP trajectory has a zig-zag pattern, and the ZMP parameter is described in the directions of X, Y and Z by the positions of the braking points and arrival times as shown in FIG. 13. As stated before, the ZMP is referred to only in the X-direction, but is similar in the Y-direction. With regard to the Z-direction, since it is assumed that the ZMP is continuous in that direction when generating the mixed gait, it is not necessary to make it continuous by the model in that direction.

The motion parameters are comprised of feet trajectory parameters and the body trajectory parameters. The feet trajectory parameters are comprised of initial free leg (foot lifting) position and orientation, final free leg (foot landing) position and orientation, and periods or time of the double-leg supporting phase and the single-leg supporting phase, etc. The body trajectory parameters include parameters defining the body orientation, the body height (a value in the Z-direction), initial body position (displacement) and velocity, etc.

Based on these, instantaneous values of the positions and orientations of both feet and the position, velocity and orientation of the body are generated in a mixed gait instantaneous value generator in accordance with the technique proposed by the assignee in Japanese Laid-Open patent applications Hei 5 (1993)-318,339 and Hei 5 (1993)-324,115. In the gait generation, the boundary conditions of the body position and velocity are neglected. In the specification, the instantaneous value is used to describe a value in each control cycle. The velocity is determined by calculating a difference between positional instantaneous values in adjacent control cycles. The orientation refers to a direction in space. The body position is, as mentioned earlier, the position of the representative point such as the center of mass of the body 24.

A sequencer in the figure controls time in walking and switches the gaits. To be more specific, it initializes a timer, updates a timer for every control cycle, watches the end of a desired gait to switch to another desired gait, and initializes a timer so as to switch the supporting leg, etc. In the double-leg supporting phase, in order to identify the legs, the leg kept in contact with the floor during the subsequent single walking step is deemed as the supporting leg and the other as the free leg.

A gait generation method (recipe) determinator determines how to construct a mixed gait to generate a desired gait. More specifically, it selects the standard gaits to be mixed, determines weights for the weight-averaging calculation, and an additional amount for the free leg foot position. Here, the correction amount is a difference or error between an initial free leg demanded position in a desired gait and an initial free leg position in the mixed gait.

A model behavior parameter determinator determines or calculates the amount of body position discontinuity and the amount of model velocity discontinuity between the current mixed gait and the next mixed gait generated by the gait generation method determinator. The model behavior parameter determinator determines the amount of model position skipping, the amount of model velocity skipping, and the amount of model ZMP shifting in response to the amounts of body position/velocity discontinuities and the correction amount of the free leg foot position, such that the desired gaits finally obtained are continuous.

The model behavior parameter determinator also determines the amount of ZMP correction in response to the amount of model position skipping, the amount of model velocity skipping and the amount of model ZMP shifting and outputs a trapezoidal pattern typically once per walking step. Since the amount of ZMP correction is a ZMP pattern to be fed to the models (illustrated as model R and model L), it is also referred to as "model ZMP", more specifically "model ZMP parameter" or "model ZMP trajectory parameter", and is illustrated in FIG. 3 as "ZMP parameters for model R" and "ZMP parameters for model L". The model ZMP parameter is described by the height of the trapezoid, the amount of model ZMP shifting and the time table at each braking point. The time table may, however, be fixed for all the gaits.

A model ZMP trajectory generator calculates the instantaneous value of the model ZMP based on the aforesaid model ZMP parameter. As stated above, the system is provided with two dynamic deviation models (illustrated as R, L) and in response thereto, two model ZMP trajectory generators are provided for the model R, L. The models R, L are the inverted pendulum dynamic deviation models which calculate or determine the quantities of state such as model body position, and model body velocity on a real-time basis.

A gait mixer generates a mixed gait, more specifically, mixed gait parameters of the standard gaits in response to the gait generation method determined by the gait generation method determinator in accordance with a mixed gait generation algorithm explained later.

A mixed gait instantaneous value generator determines or calculates instantaneous values (i.e., values in each control cycle) of the mixed gait, more specifically, mixed body position and velocity, mixed desired ZMP, mixed body orientation (desired body orientation) and mixed feet position and orientation (desired feet position and orientation) in response to the aforesaid generation method in accordance with the gait generation algorithm.

The determined mixed body position is added to the sum of the displacements of the model R, L (determined by the models R, L) to determine the desired body position. Similarly, the determined mixed desired ZMP is added to the sum of ZMPs (determined by the model ZMP trajectory generators for the models R, L) to determine the desired ZMP.

The desired body position (and velocity) and the desired ZMP as well as the desired body orientation and the desired feet position and orientation, are sent to a stability controller in which some of the gait instantaneous values are corrected or modified by controlled variables (detected variables) such as body inclination (tipping) angle, and thereby a corrected desired body position and orientation, corrected desired ZMP, corrected desired feet position and orientation, and corrected desired body orientation are determined. The operation of the stability controller corresponds to the aforesaid compliance control.

Output of the stability controller is sent to an inverse kinematic calculator in which joint angle commands are deterministically calculated by an inverse kinematic solution. Since the robot 1 has 12 joints, the commands are calculated for the 12 joints.

The above is the operation of the first CPU 80, and based on the command values, the second CPU 82 conducts the joint servo control such that joint angles traces the commands.

In the above, the stability controller and the inverse kinematic calculator are not included in the system according to the present invention and since the operation of the controller and calculator are described in earlier applications proposed by the assignee, no further explanation will be made.

Hereafter, the standard gaits are further explained.

The standard gaits are described in this specification as time functions. Each standard gait is described by a set of g(t) and f(t) defined as follows.

g(t): gait functions describing the motion of the robot. Specifically, the functions represent the positions and orientations of the robot components at time t, more specifically, the positions and orientations of the robot body and feet;

f(t): gait functions describing ZMP trajectory. Specifically, the functions represent, as mentioned earlier, the positions (x, y, z) of the ZMP at time t.

To be more specific, g(t) and f(t) are functions which are defined by the gait parameters. Although it is preferable that all the parameters are represented, so as to clearly indicate a gait, since the number of parameters is large, only those parameters necessary for the following explanation are described here.

g(t: a, b, c, d, x(k), y(k)): functions describing robot motion trajectories;

f(t: a, b, c, d): functions describing the ZMP trajectory (functions describing the floor reaction force).

where:
        a: initial free leg foot orientation (indicative of the turning angle of the robot)
        b: initial free leg foot positions in the X-direction (walking stride)
        c: the X-coordinate of ZMP in the single-leg supporting phase
        d: the Y-coordinate of ZMP in the single-leg supporting phase
        x(k): the X-coordinate of body positions in time-series
        y(k): the Y-coordinate of body positions in time-series In the representation, the time-series data is treated as a kind of parameter. Inherently, without a time-series table describing the body position, the gait is solely or deterministically determined based on the parameters of the initial body position and velocity and a constraint condition defining the body height. The body position time-series data is thus redundant. However, in order to shorten the gait generation time in a real-time basis, the body position time-series data table is treated here as a kind of parameter describing gaits.

In the embodiment, the initial body position and velocity parameters are different for different gaits. Since, however, the initial body position and velocity can be calculated from the first and second values of the body position time-series, no further explanation is made here.

In the embodiment, the standard gaits such as that for beginning walking from standing position are prepared on a off-line computer as mentioned previously. The following three gaits are examples.

standard gait No. 0
        g(t: a0, b0, c0, d0, x0(k), y0(k))
        f(t: a0, b0, c0, d0)

standard gait No. 1
        g(t: a1, b0, c1, d1, x1(k), y1(k))
        f(t: a1, b0, c1, d1)

standard gait No. 2
        g(t: a0, b2, c2, d2, x2(k), y2(k))
        f(t: a0, b2, c2, d2)

FIGS. 11 to 17 illustrate the initial free leg foot positions and orientations, and the final free leg foot positions and orientations, etc. In order to describe the gaits, the coordinate system is set with a reference point on the supporting leg foot sole floor-contact surface as the origin, and the to-and-fro direction of the supporting leg foot as the X-direction and the left-to-right direction as the Y-direction.

Figure 18:
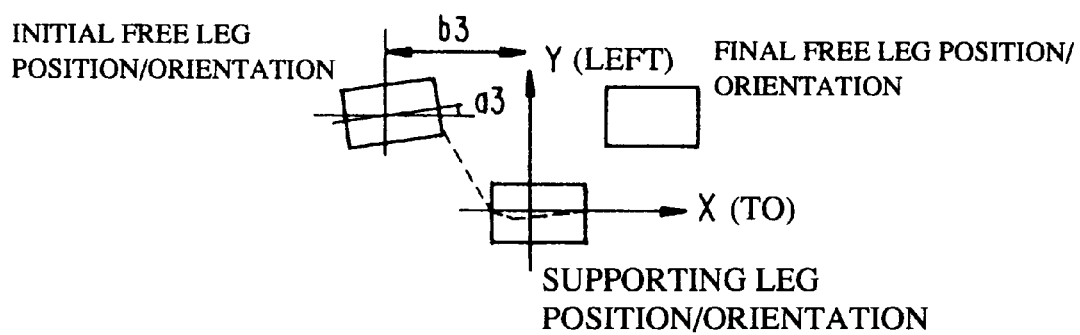
FIG. 18 is a view, similar to FIG. 11, but showing the demanded position and orientation of the feet referred to in the system according to the present invention.
Figure 19:
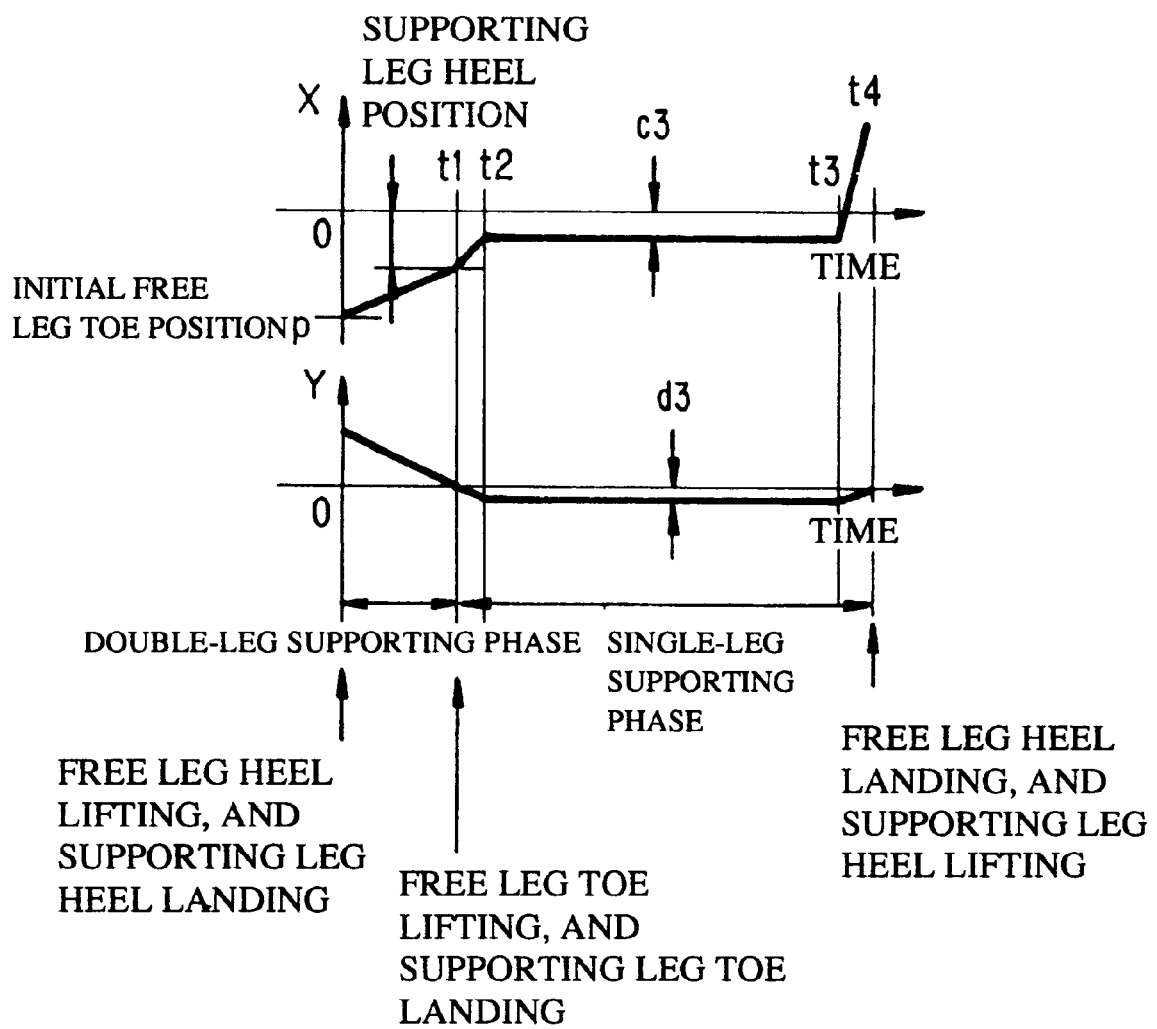
FIG. 19 is a view, similar to FIG. 13, but showing the trajectory of the ZMP for the demanded gait referred to in the system according to the present invention.

Assume that the demands for gait are given as shown in FIGS. 18 and 19. Taking as an example the gait generation for satisfying the demand using the standard gaits, the operation of the process of gait mixing is explained.

The demanded mixed gait should have a given initial free leg orientation a3 and its to-and-fro position b3. It should be noted here that the body position and velocity at the gait boundary and the initial and final free leg foot positions are not always indicated in the gait demand, since these can be satisfied if the model behavior is added to the mixed gait.

In the mixed gait generation, the parameter a is a3 and b is b3 in the demanded mixed gait. The problem is how to determine the other parameters c, d and the table values x(k), y(k) so to satisfy the demand.

The demanded mixed gait is first described as follows;
    g(t: a3, b3, c3, d3, x3(k), y3(k))
    f(t: a3, b3, c3, d3).

Then the other parameters are determined.

Here, the terms are defined.

The parameters a, b include values input as a request (same as the aforesaid demand for gait) from outside of the system (such as by an operator via the joystick 62) or through another system. The parameter whose value is demanded directly to be a determined value is called "directly-determined parameter". On the other hand, parameters such as c, d, or the tables x(k), y(k) are dependent parameters or tabulated data, since they are determined based on the directly-determined parameter such that they satisfy the gait conditions. Since it is quite difficult to directly determine the time-series tabulated data, the time-series tabulated data is rarely a directly-determined parameter.

The aforesaid standard gaits No. 1 or No. 2 (other than the standard gait No. 0) are based on the standard gait No. 0 and only one of the directly-determined parameters, (i.e, a or b differs from that of standard gait No. 0). The basic gait among the selected standard gaits, i.e., standard gait No. 0 is called the base gait.

The determination of the demanded gait parameters (referred to sometimes as "mixed parameters") will be explained.

The dependent parameters c3, d3 and the dependent tabulated data x3(k), y3(k) vary in response to the directly-determined parameters a, b so as to satisfy the conditions of gait. Moreover, it is supposed that they vary continuously in response to the change in the parameters a, b. The values c3, d3, etc., are therefore continuous functions of the parameters a, b. This means that the following principle of approximation can be utilized. In other words, the demanded gait parameters can be calculated by approximation.

To be more specific, if function p is a continuous function, it can be approximated using the following expression.

$$P(a0+\Delta a, b0+\Delta b)=P(a0, b0)+\delta P/\delta a|(a=a0, b=b0)\times\Delta a+\delta P/\delta b|(a=a0, b=b0)\times\Delta b \quad \text{Eq. 1}$$

here, $\delta P/\delta a|(a=a0, b=b0)$ is a partial differential of P relative to a at a=a0, b=b0;

$\delta P/\delta b|(a=a0, b=b0)$ is a partial differential of P relative to b at a=a0, b=b0.

Moreover, since $\delta P/\delta a|(a=a0, b=b0)=(P(a0+\Delta a1, b0)-P(a0, b0))/\Delta a1$ $\delta P/\delta b|(a=a0, b=b0)=(P(a0, b0+\Delta b2)-P(a0, b0))/\Delta b2$ Eq. 1 can be rewritten as Eq. 2.

$$P(a0+\Delta a, b0+\Delta b)=P(a0, b0)+\{P(a0+\Delta a1, b0)-P(a0, b0)\}/\Delta a1\times\Delta a+\{P(a0, b0+\Delta b2)-P(a0, b0)\}/\Delta b2\times\Delta b \quad \text{Eq. 2.}$$

Continuing the explanation, the demanded mixed gait parameters are calculated from the standard gaits by dividing internally or externally (i.e., interpolating) all the dependent parameters and time-series tabulated data using the following equations. This is because the dependent parameters and tabulated data in proportion to the directly-determined parameter. If a3 is between a1 and a2, it is calculated by internal division, and if a3 is not between a1 and a2, it is obtained by external division. When the difference in the parameter can be neglected from the point of dynamics, the parameter may be the same as that in the base gait. If the time-series tabulated data is calculated in the first CPU 80 at one time, the load of calculation becomes great. Thus, it suffices if the internal or external division is conducted only for data in the current control cycle.

The followings are the aforesaid equations for mixing using internal or external division.

$$c3=c0+(c1-c0)\times(a3-a0)/(a1-a0)+(c2-c0)\times(b3-b0)/(b2-b0)$$

$$d3=d0+(d1-d0)\times(a3-a0)/(a1-a0)+(d2-d0)\times(b3-b0)/(b2-b0)$$

$$x3(k)=x0(k)+(x1(k)-x0(k))\times(a3-a0)/(a1-a0)+(x2(k)-x0(k))\times(b3-b0)/(b2-b0)$$

$$y3(k)=y0(k)+(y1(k)-y0(k))\times(a3-a0)/(a1-a0)+(y2(k)-y0(k))\times(b3-b0)/(b2-b0) \quad \text{Eq. 3}$$

These equations are weighted average calculations of the standard parameters and tabulated data. The first equation can be rewritten as follows.

$$c3=\{1-(a3-a0)/(a1-a0)-(b3-b0)/(b2-b0)\}\times c0+(a3-a0)/(a1-a0)\times c1+(b3-b0)/(b2-b0)\times c2.$$

Since the sum of the weighted coefficients of c0, c1, c2 is 1, c3 is a weighted average whose weights of c0, c1 and 2 are respectively;

$\{1-(a3-a0)/(a1-a0)-(b3-b0)/(b2-b0)\}$ $(a3-a0)/(a1-a0)$ $(b3-b0)/(b2-b0)$.

In the manner explained above, the mixed gait parameters are determined, and instantaneous values thereof (i.e., the values at each control cycle) are generated in the same way as the gait generation algorithm of the standard gait.

Based on the above, the operation of the system according to the invention will be explained with reference to a flow chart shown in FIG. 20.

The program begins at S10 in which the standard gaits prepared by an external computer are loaded to the ROM 84 (or RAM 74) of the on-board microcomputer (the first CPU 80 of the control unit 26). The program proceeds to S12 in which final body position and velocity in each standard gait are calculated and stored in the memory.

When generating a mixed gait by calculating a weighted average of a plurality of standard gaits while keeping the supporting leg positions and orientations unchanged, the initial and final body positions and velocities are equal to the weighted averages of the initial and final body position and velocity of the standard gaits. For this reason, the initial and final body positions and velocities in the standard gaits are stored as tabulated data beforehand and are read during walking to determine or calculate the initial and final body positions and velocities of the mixed gait. For example, since the body positions have been prepared as a function x(k) as mentioned above, the final body position and velocity are calculated from the final value and the value preceding the final value in the tabulated data. More specifically, the final value in the tabulated data is immediately determined as the final body position, and the difference between this value and the value preceding the fmal value is calculated and is used to determine the final body velocity.

The program then proceeds to S14 in which knowledge or information relating to the aforesaid dynamic deviation model is obtained.

Figure 21:
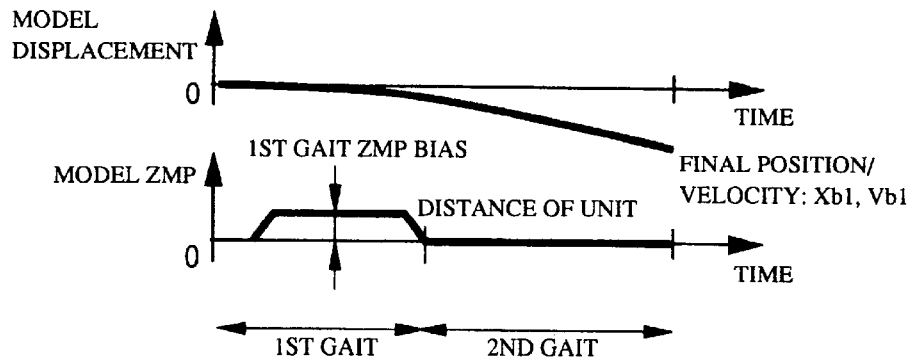
FIG. 21 is a time chart showing the characteristics of the behavior of the model illustrated in FIG. 4 developed in response to a unit amount of ZMP shifting (bias) in the 1st gait (current gait)
Figure 22:
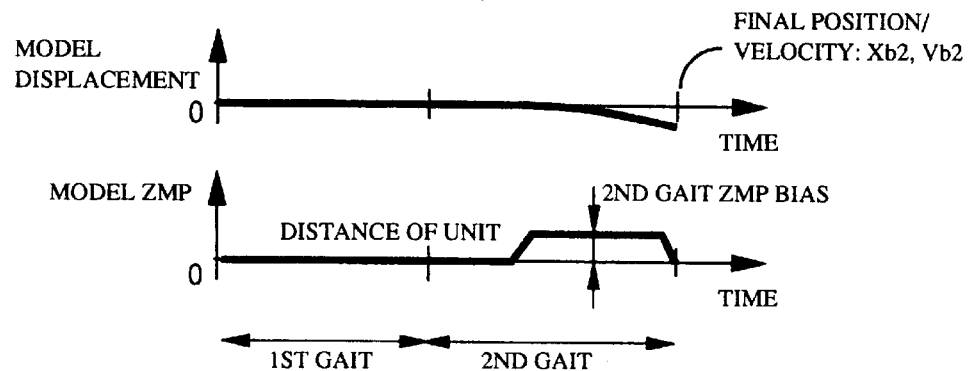
FIG. 22 is a view, similar to FIG. 21, but showing the characteristics of the behavior of the model developed in response to the unit amount of ZMP shifting (bias) in the 2nd gait (next gait)
Figure 23:
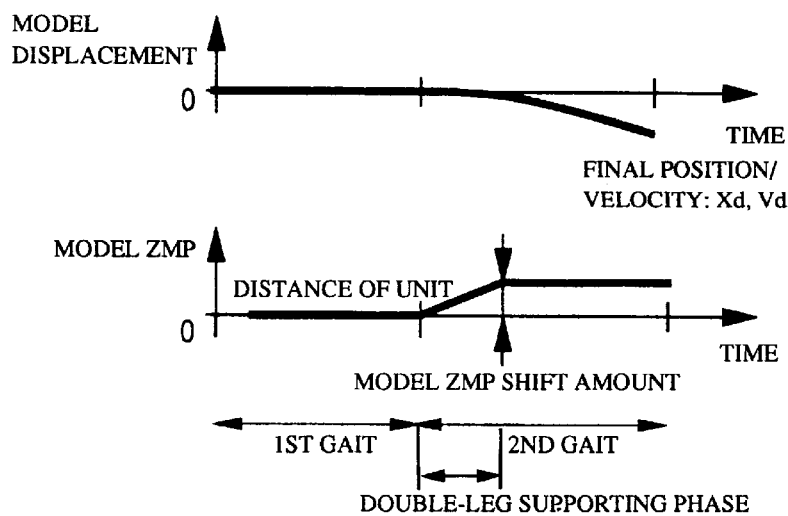
FIG. 23 is a view, similar to FIG. 21, but showing the characteristics of the model behavior developed in response to a unit amount of ZMP shifting (bias)
Figure 24:
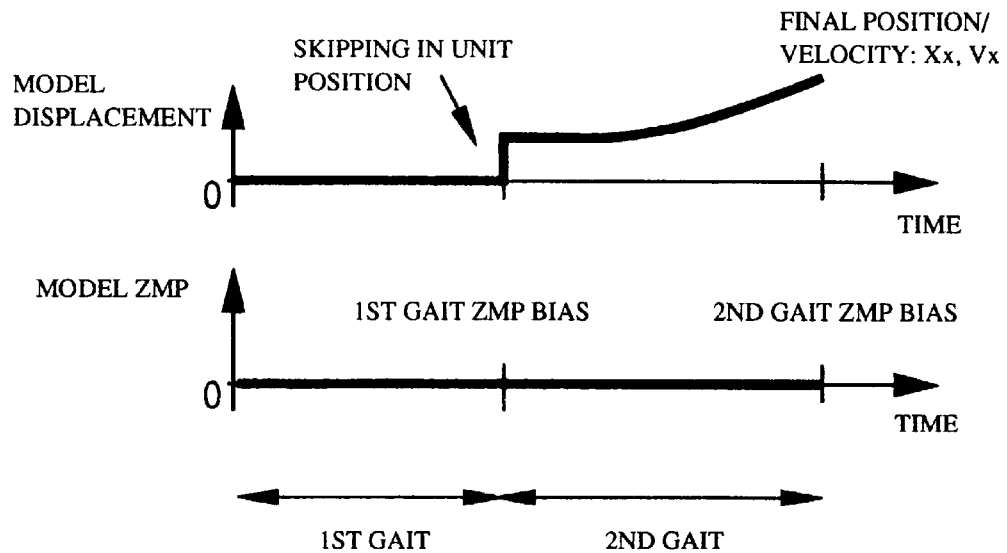
FIG. 24 is a view, similar to FIG. 23, but showing the characteristics of the model behavior developed in response to a unit amount of model position skipping.
Figure 25:
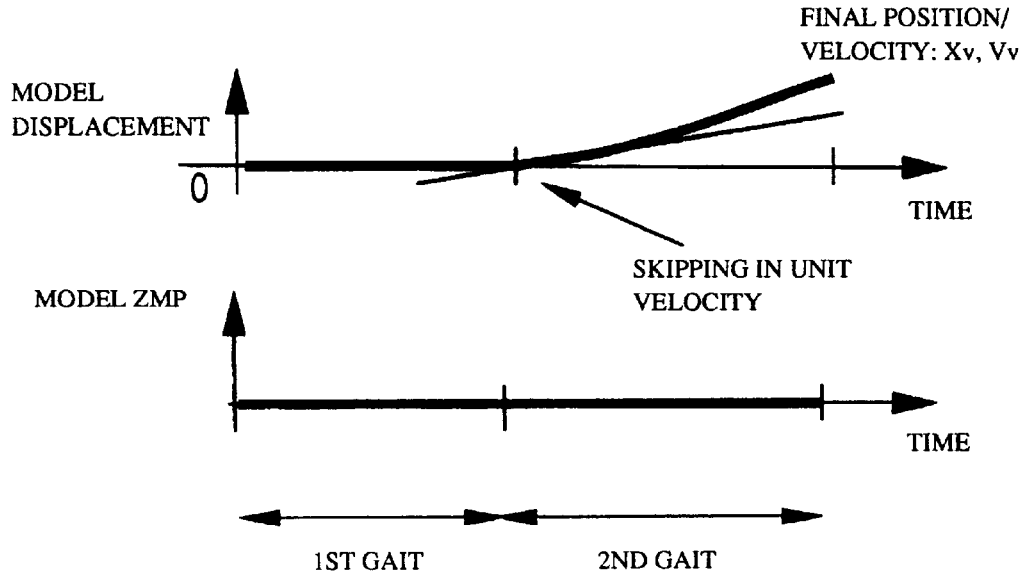
FIG. 25 is a view, similar to FIG. 24, but showing the characteristics of the model behavior developed in response to a unit amount of model velocity skipping.

In order to predict the model behavior quickly to immediately determine or calculate the model ZMP pattern which can effect the model behavior as desired, the characteristics of model behavior relative to the typical model trajectory pattern are calculated or determined beforehand in this embodiment and are stored in the ROM 84 (or RAM 74). The typical model ZMP pattern is referred to hereinafter as "basic model ZMP pattern". More specifically, as illustrated in FIGS. 21 and 22, the model displacement, i.e., the characteristics of behavior relative to the ZMP bias, when the model ZMP is displaced in the 1st and 2nd gaits, is calculated or determined beforehand and is stored. Moreover, as illustrated in FIGS. 23 to 25, the amount of model ZMP shifting, the amount of model position skipping and velocity skipping, and the characteristics of model behavior per unit amount are calculated or determined beforehand and stored. These will be used in the determination of the ZMP bias explained later.

The model ZMP trajectory pattern (illustrated as "model ZMP" in the figures) is determined in the shape of a trapezoid as mentioned earlier, and the time distribution or time table is defined by the nature of the 1st and 2nd gaits (such as gait to start walking, gait for normal turning, gait to stop walking). In the basic model ZMP trajectory pattern parameter, only one of the parameters other than time distribution is determined to be a unit amount, while the others are determined as zero. Specifically, supposing standing upright and stopping (i.e., the model displacement becomes zero) as the initial state of the model, the model behavior in response to each basic ZMP trajectory pattern is determined through repetitive calculation or analysis, and the final model position and velocity of the 2nd gait are stored.

While, similarly supposing the upright standing and stopping as the model initial state and supposing the model ZMP as being zero, the behavior when the model position or velocity is discontinuously skipped by the unit amount at the boundary between the 1st gait and 2nd gait is calculated and the final model position and velocity of the 2nd gait are similarly stored.

Since the model is linear, it becomes possible to obtain a model behavior having any desired character by linear combination of the basic model behaviors. Thus, it becomes possible to appropriately calculate a model input from the linear combination of the basic model ZMP patterns, hence decreasing the volume of calculation.

Figure 20:
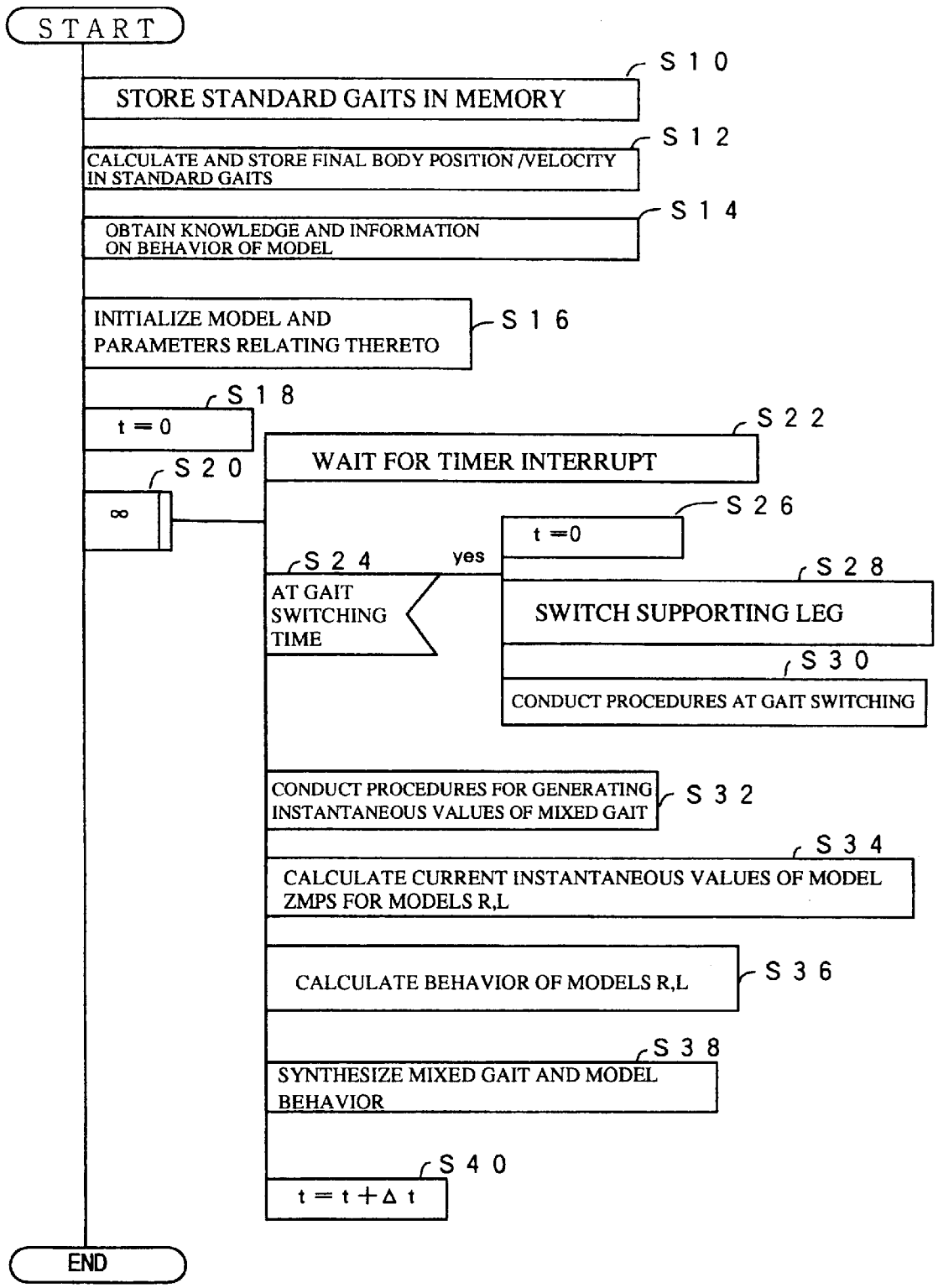
FIG. 20 is a main flow chart showing the operation of the system according to the present invention illustrated in FIG. 3.

Returning to the explanation of FIG. 20, the program proceeds to S16 in which the model and the parameters relating thereto including model trajectory parameters such as the amount of skipping at the gait boundary, model ZMP parameters, etc., are initialized or reset.

The program proceeds to S18 in which the timer value t is reset to zero (in other words, the timer is started), to S22, via S20, in which a timer interrupt is waited for (the timer is different from that in S18). The time interrupt is executed once per predetermined period (i.e., the control cycle) such as 20 ms.

When the timer interrupt is effected in S22, the program proceeds to S24 in which it is determined whether the gait is at the time of switching, more specifically whether the current walking step has been completed. When the result is negative, the program immediately jumps to S32. On the other hand, when the result is affirmative, the program proceeds to S26 in which the timer is reset to zero, to S28 in which the supporting leg is switched to the other side, more precisely the current supporting leg becomes L (left) if the preceding was R (right), or R if the preceding was L. For ease of explanation, it is assumed that the current supporting leg is R and the current free leg is L.

Moreover, for ease of understanding, the terms "current gait", "last gait" and "next gait" are explained. The current gait is a gait which is generated and output at the current control cycle. The gait just before the current gait is the last gait. The gait that follows the current gate is the next gait. Again briefly explained, the 1st gait and 2nd gait are conceptual gaits used when discussing the model behavior.

The program proceeds to S30 in which gait switching procedures are conducted.

Figure 26:
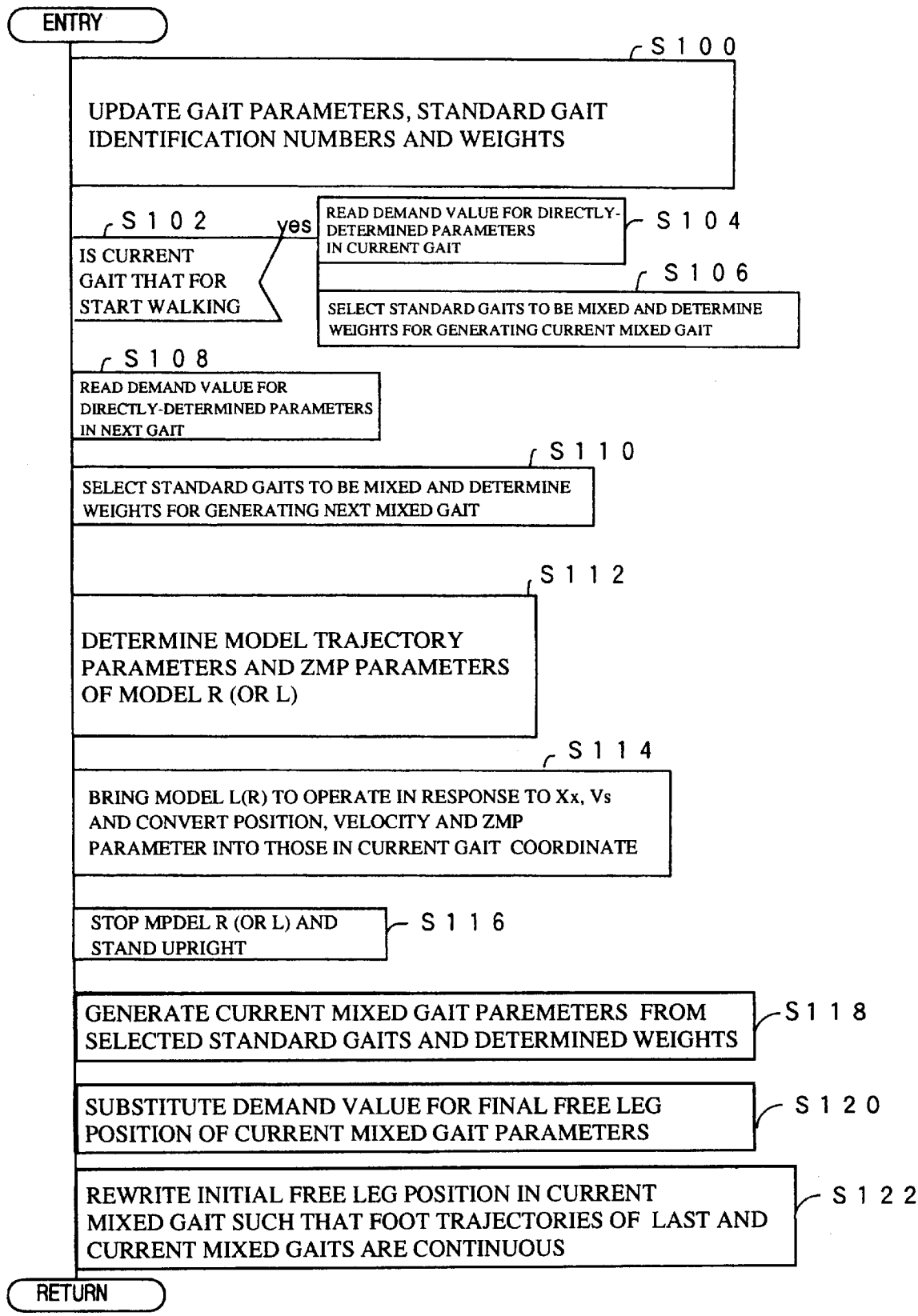
FIG. 26 is a subroutine flow chart of the flow chart illustrated in FIG. 20 showing the procedures performed at the time of gait switching.

FIG. 26 is a subroutine flow chart showing the gait switching procedures.

The program starts in S100 in which, since it is the time of gait switching, the gait parameters are updated. Specifically, the values of the current gait (in memory) are moved to the previous (last) gait parameters (in memory), and next gait parameters are moved to the current gait parameters (in memory). The identification number of standard gaits and their weights to be mixed to generate the next mixed gait are rewritten as those for the current mixed gait.

The program proceeds to S102 in which it is determined whether the gait is for initiating walking, i.e., whether it is the start of walking from standing position. When the result is negative, the program jumps to S108. When the result is affirmative, on the other hand, the program proceeds to S104 in which the demand value of the directly-determined parameters of the current gait (i.e., 1st gait for the model R) are read. The program proceeds to S106 in which standard gaits to be mixed are selected and weights are determined in order to generate the current mixed gait (i.e., 1st mixed gait for the model R). At this time, it is possible to neglect the demand for the final free leg position. However, the robot turning angle (i.e., the initial free leg foot orientation) should be satisfied if demanded.

The program proceeds to S108 in which the demand value for the directly-determined parameters of the next gait (2nd gait) is read, to S110 in which standard gaits to be mixed are selected and weighs are determined in order to generate the next mixed gait (2nd mixed gait). At this time, it is possible to neglect the demand for the initial and final free leg position. However, the robot turning angle (i.e., the initial free leg foot orientation) should be satisfied if demanded. If standard gaits whose initial free leg positions are different from each other have been prepared, the nearest or closest one to the demand is selected as the base gait. The mixed gait need not forcibly be accorded with the demand value, since, if forcibly accorded, the body trajectories would deviate greatly from the standard gait, degrading long period walking continuity.

The program proceeds to S112 in which the model trajectory parameters and the ZMP parameter of the model R are determined. The model R's trajectory parameters should be determined such that the model R cancels the discontinuity at the boundary between the current mixed gait (1st mixed gait) and the next mixed gait (2nd mixed gait). The model R's ZMP parameters should be determined such that the ZMP trajectory of the current gait is continuously connected with that in the next gait and the model R stops and stands straight after two waking steps, in other words after the next gait has been completed.

Figure 27:
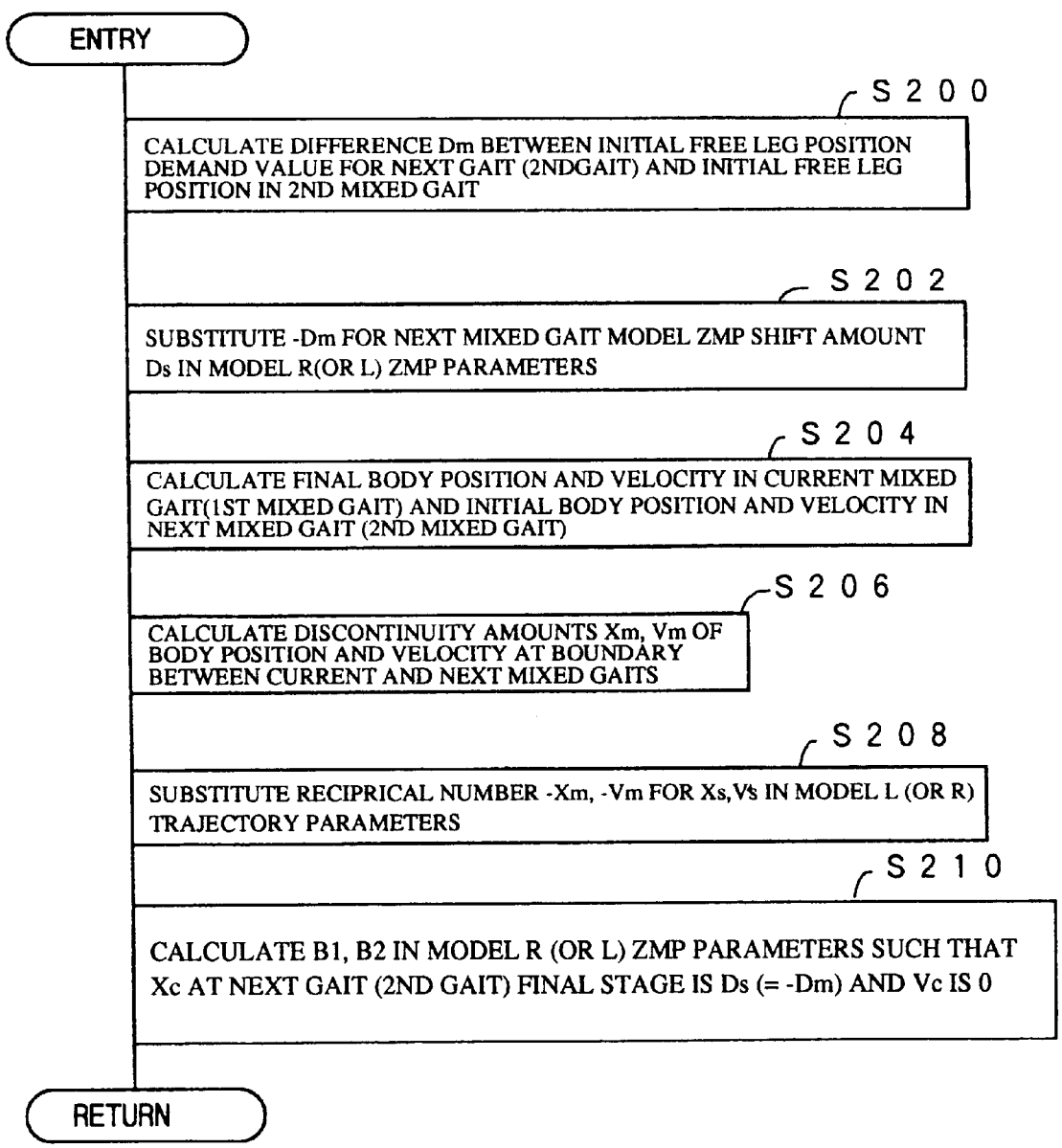
FIG. 27 is a subroutine flow chart of the flow chart illustrated in FIG. 26 showing the determination of the model trajectory parameter and the model ZMP parameter.

FIG. 27 is a flow chart showing the subroutine of the parameter determination.

The program begins at S200 in which the amount (difference) Dm between the initial free leg position demand value for the 2nd gait and the initial free leg position of the 2nd mixed gait (mixed gait for the 2nd gait) is calculated. For example, when the initial fee leg position of the 2nd gait is predicted as −50 cm, but that of the sum of each behavior resulting in by each determined amount. This means that the final model position Xc and velocity Vc in the 2nd gait can be obtained from Eq. 4. In the equation, the constants used are shown in FIGS. 21 to 25.

$$Xc = Xx \times (-Xm) + Xv \times (-Vm) + Xd \times (-Dm)$$

$$Vc = Vx \times (-Xm) + Vv \times (-Vm) + Vd \times (-Dm) \qquad \text{Eq. 4}$$

The 1st gait ZMP bias B1 and the 2nd gait ZMP bias B2 should accordingly be determined such that, when the behavior in response to the 1st gait ZMP bias B1 and the 2nd gait ZMP bias B2 are added with the above behavior, the robot position Xc becomes Ds (i.e., −Dm) and the velocity Vc becomes zero at the end of the 2nd gait.

For that purpose, Eq. 5 must be satisfied.

$$Xx \times (-Xm) + Xv \times (-Vm) + Xd \times (-Dm) + Xb1 \times B1 + Xb2 \times B2 = -Dm$$

$$Vx \times (-Xm) + Vv \times (-Vm) + Vd \times (-Dm) + Vb1 \times B1 + Vb2 \times B2 = 0 \qquad \text{Eq. 5}$$

Eqs. 4 and 5 yields Eq. 6.

$$Xb1 \times B1 + Xb2 \times B2 = -Xc - Dm$$

$$Vb1 \times B1 + Vb2 \times B2 = -Vc \qquad \text{Eq. 6}$$

Accordingly, the model position Xc and velocity Vc can be calculated from Eq. 4 and the 1st gait ZMP bias B1 and the 2nd gait bias B2 can then be calculated by solving the simultaneous equations shown in Eq. 6

Returning to the explanation of FIG. 26, the program proceeds to S114 in which the position and velocity of the model L (which was started one walking step earlier) is operated (skipped ) in response to the amounts of position skipping Xs and velocity skipping Vs of the model L calculated in S210 one walking step earlier. Moreover, the coordinate system for the model L and its ZMP parameter is switched to those of the current gait coordinate and the model L and its ZMP parameters are translated in response thereto. Since the model L began to move one walking step earlier, for the model L the 1st gait is the last gait and the second gait is the current gait.

The program proceeds to S116 in which the model R is forcibly stopped generated mixed gait is −40 cm, the procedure in this step is to calculate the difference (=−10 cm).

The program proceeds to S202 in which the value −Dm is substituted for the amount of model ZMP shifting Ds in the ZMP parameter of the model R. Again taking the same example, this means that the amount of model ZMP shifting is rewritten as 10 cm.

The program proceeds to S204 in which the final body position and velocity of the current mixed gait (1st mixed gait) and the initial body position and velocity of the next mixed gait (2nd mixed gait) are determined. This is done by multiplying the final and initial body positions and velocities of the gaits by mixing weights and by summing the products thereof. Since the final body position and velocity of the standard gaits have been obtained and stored in S12, the calculation can be sped up by using the stored values.

The program proceeds to S206 in which the amount of discontinuity of each of the body position and velocity Xm, Vm at the boundary of the current and next mixed gaits are calculated.

The program proceeds to S208 in which, in order to cancel the amounts of discontinuities Xm, Vm, the amounts of model position skipping Xs and velocity skipping Vs of the model R trajectory parameter are substituted for the reciprocal number of the amounts of discontinuities, i.e., $-Xm$, $-Vm$.

The program proceeds to S210 in which the amount of forcibly shifting of the 1st gait and 2nd gait ZMPs (i.e., the aforesaid biases of the 1st gait and 2nd gait) B1, B2 of the model R ZMP parameter are determined such that the model R stops at the end of the 2nd gait, in other words the final model position Xc becomes Ds (i.e., $-Dm$) and the final model velocity Vc becomes 0 when viewed from the 1st gait coordinate system.

Specifically, the ZMP biases B1, B2 are determined in accordance with the following principle. The ZMP biases B1, B2 of the 1st and 2nd gaits are best illustrated in FIG. 7. Explaining the principle, if the model is manipulated to behave as determined amounts of position skipping Xs, velocity skipping Vs and ZMP shifting Ds, and with the biases B1, B2 made zero, since the model behavior is a linear combination, it will be the and made to take a upright standing posture, in other words, its position and velocity are made zero, to prevent calculation errors from being accumulated.

The program proceeds to S118 in which the current mixed gait parameters are generated on the basis of the selected standard gaits and the determined weights. They are those obtained as the next mixed gait parameters in S110 and moved to the current mixed gait parameters in S100, unless the current gait is that for initiation of walking.

The program proceeds to S120 in which the final free leg position of the current mixed gait is substituted for the demand value. Since the change in final free leg position by the demand value, if it occurs, results in a slight change in the inertial force of the free leg, this affects the mixed gait dynamics little. Therefore, the ZMP parameter need not be changed even when the final free leg position is changed.

The program proceeds to S122 in which the initial free leg position of the current mixed gait is rewritten or varied such that the conditions of boundary of the current mixed gait and the next mixed gait accord with each other. Precisely speaking, since the free leg is still on the floor in the double-leg supporting phase, the free leg is the leg which will subsequently be lifted. If the initial ZMP shifts from the free leg toe (where the ZMP should initially be) by changing the initial free leg position, it can be remedied or corrected by the amount of model ZMP shifting.

Returning to the explanation of FIG. 20, the program proceeds to S32 in which instantaneous values of the mixed gait are generated or determined. This will be the same when the result in S24 was negative.

Figure 28:
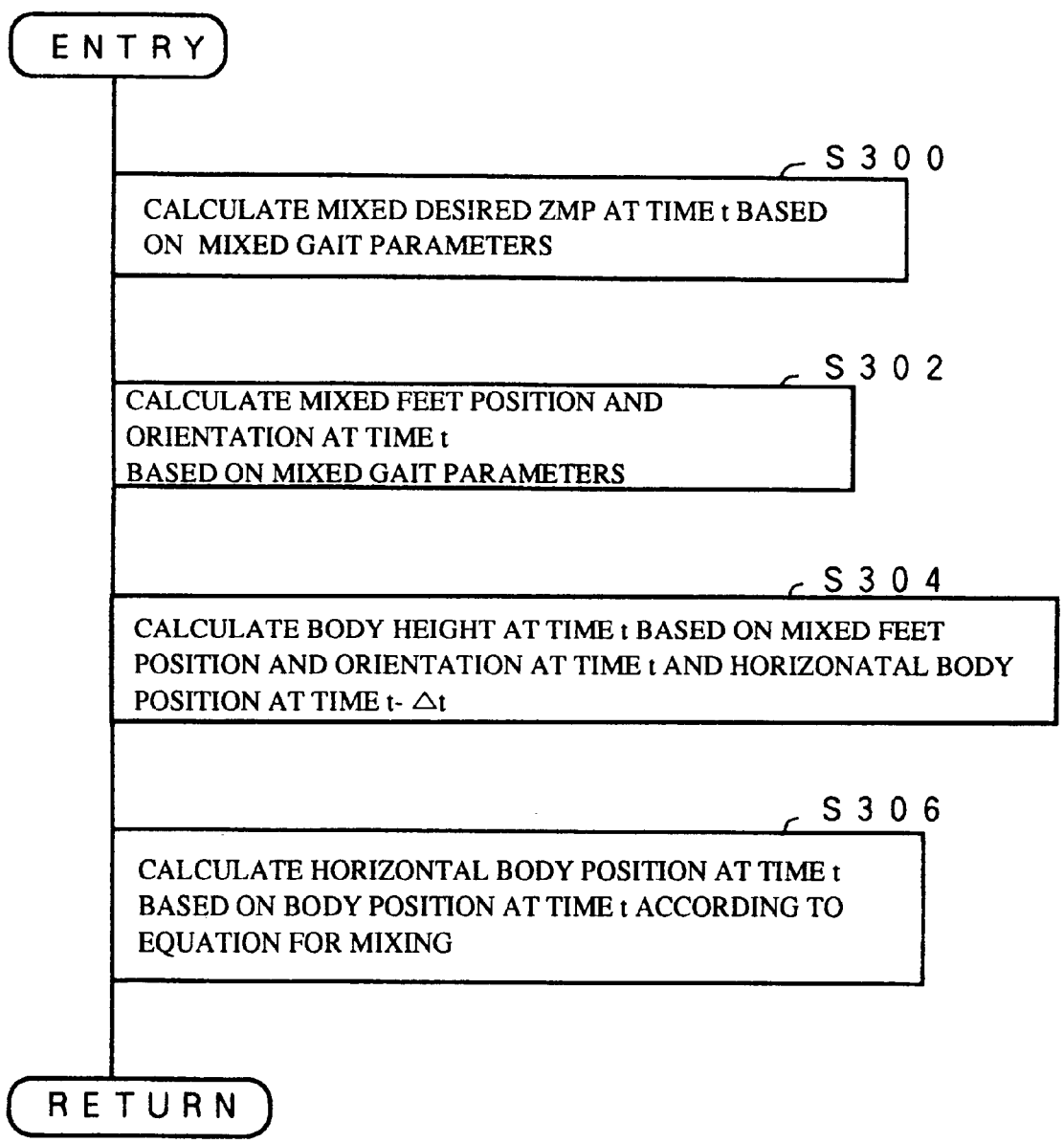
FIG. 28 is a subroutine flow chart of the flow chart illustrated in FIG. 20 showing the calculation of instantaneous values in a generated mixed gait.

FIG. 28 is a flow chart showing the subroutine for the instantaneous value determination.

The program begins in S300 in which a mixed desired ZMP at time t (t: the time of current control cycle) is calculated or determined based on the mixed gait parameters.

The program proceeds to S302 in which mixed feet position and orientation at time t are calculated or determined based on the mixed gait parameters using the aforesaid technique proposed earlier.

The program proceeds to S304 in which the body height at time t is calculated or determined based on the mixed feet position and orientation at time t and the horizontal body position at time $t-\Delta t$, using, for example, the technique mentioned in Japanese Patent Application Hei 8 (1996)-214, 260 proposed by the assignee.

The program proceeds to S306 in which the horizontal body position at time t is calculated or determined based on the body positions at time t in the selected standard gaits (including the base gait) using Eq 3. Thus, all the instantaneous values of the mixed gait are determined.

Returning to the explanation of FIG. 20, the program proceeds to S34 in which the current instantaneous values for the models R and L are calculated.

Figure 29:
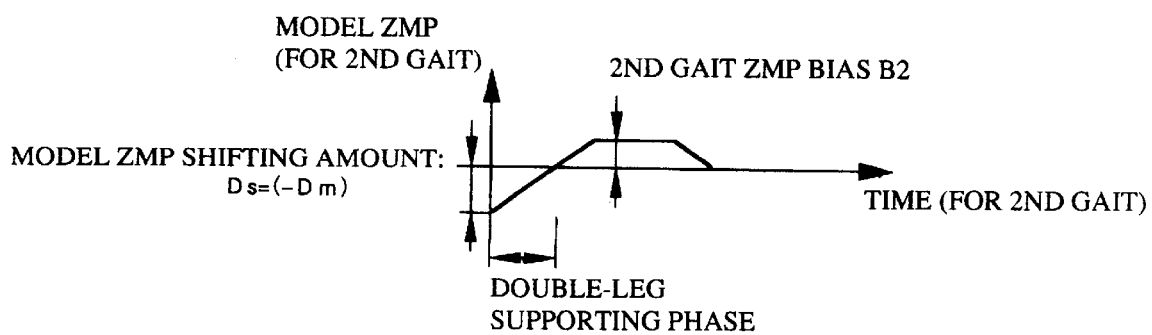
FIG. 29 is a time chart explaining the calculation of a current instantaneous value of the model ZMP referred to in the flow chart of FIG. 20.

Explaining this, the instantaneous values of the model ZMP of the 1st gait are calculated or determined based on the model R ZMP parameter and the values thus obtained are treated as the instantaneous values of the model R. Next, based on the model L ZMP parameter, the instantaneous values of the model ZMP of the 2nd gait are calculated or determined and are treated as the instantaneous values of the model L. As mentioned above, the coordinate system of the 2nd gait is different from that for the 1st gait. The coordinate system for the 2nd gait is determined such that the value of the 2nd gait model ZMP at the end of the double-supporting phase is zero, as illustrated in FIG. 29.

The program proceeds to S36 in which the models R, L are applied or substituted for the instantaneous values of the model ZMPs thus obtained. In addition, the model ZMPs of the two models are added together to obtain the sum of the model ZMPs. Similarly, the displacements (body position displacements) of the models R, L are added together to determine the sum of model displacements, as shown in FIG. 3.

The program proceeds to S38 in which the mixed gait is synthesized with the models R, L. More specifically, as illustrated in FIG. 3, the sum of model displacements just obtained is added to the body position and velocity in the mixed gait to determine desired body position and velocity. The sum of model ZMPs is similarly added to a desired ZMP in the mixed gait to determine a desired ZMP.

As stated before, no attention is paid in this embodiment to the change (if made) of the initial free leg position in the ZMP parameter of the mixed gait. Since, however, the change of ZMP trajectory necessary for a possible initial free leg positional change is taken account in the ZMP trajectory of the model, the eventual ZMP trajectory of the desired gait will be free from discontinuity.

The program proceeds to S40 in which the time is updated by $\Delta t$ and then returns to S22 to repeat the procedures.

Thus, the desired body position, desired body orientation (body orientation in the mixed gait), desired feet position and orientation (feet position and orientation in the mixed gait) and the desired ZMP are determined. The stability controller changes, if needed, the instantaneous posture determined by the above parameters, and based on the instantaneous posture, the inverse kinematic calculator calculates the joint angle commands.

Having been configured in the foregoing manner, the system in the embodiment makes it possible to generate a gait freely on a real-time basis such that the robot walks for a long continuous period of time, for example, with a desired stride or turns in a desired angle. The system also makes it possible to drive the biped robot, on the basis of the gait thus generated, to walk as desired.

In the operation of the system, standard gaits including the base gait are selected from among those prepared beforehand in response to the demand for a gait with particular conditions such as a certain stride length or turning angle. The selected gaits are subject to mixing such as synthesis modification or weighted averaging, to determine an approximate gait on a real-time basis which satisfies the demand.

With the arrangement, it becomes possible to generate a gait having an accurate stride and/or turning angle. Moreover, it will be possible to combine and mix together two or more standard gaits to generate an average gait therebetween if their conditions of boundary are the same or similar to each other.

With the arrangement, it becomes possible to decrease the amount or volume of calculation. More particularly speaking, the amount of calculation on the first CPU 80 will be reduced to 10%, compared with a case in which the robot dynamics problem is solved on a real-time basis. Moreover, as the appropriate standard gaits are stored in advance and a gait is newly generated by mixing two or more standard gaits together, it becomes possible to reduce the amount or capacity of memory (the ROM 84). Furthermore, as the standard gaits can be prepared optimally, it becomes possible to generate easily, without trial and error, a new gait which satisfies the conditions 1) to 5) mentioned earlier.

Figure 30:
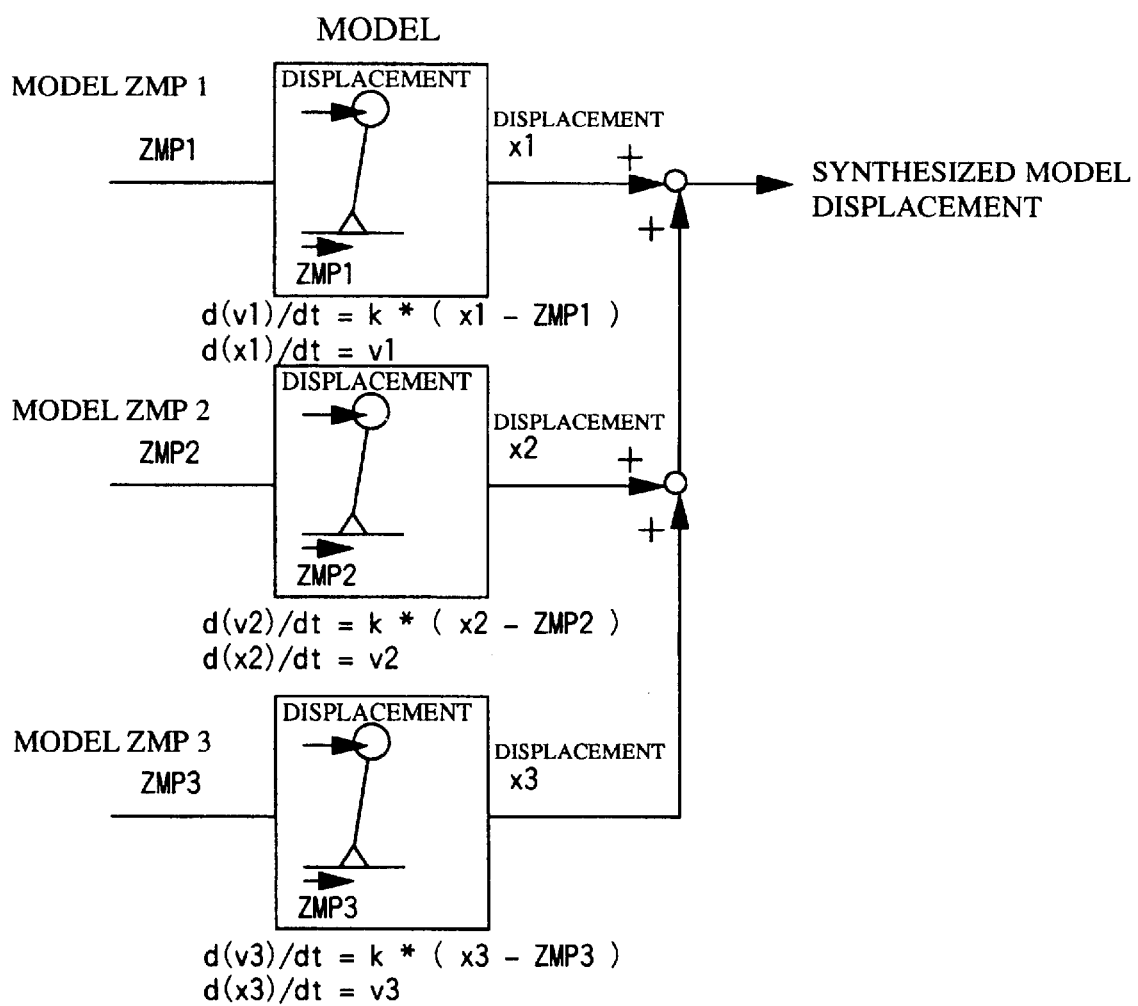
FIG. 30 is a view, similar to FIG. 9, but showing the configuration of the system according to a second embodiment of the present invention in which three examples of the model illustrated in FIG. 4 are provided to prevent the calculation errors from being accumulated.

FIG. 30 is a view, similar to FIG. 9, but showing the configuration of the system according to a second embodiment of the present invention.

In the second embodiment, the system is configured to have three dynamic deviation models, contrary to the first embodiment in which the system has two models.

Figure 31:
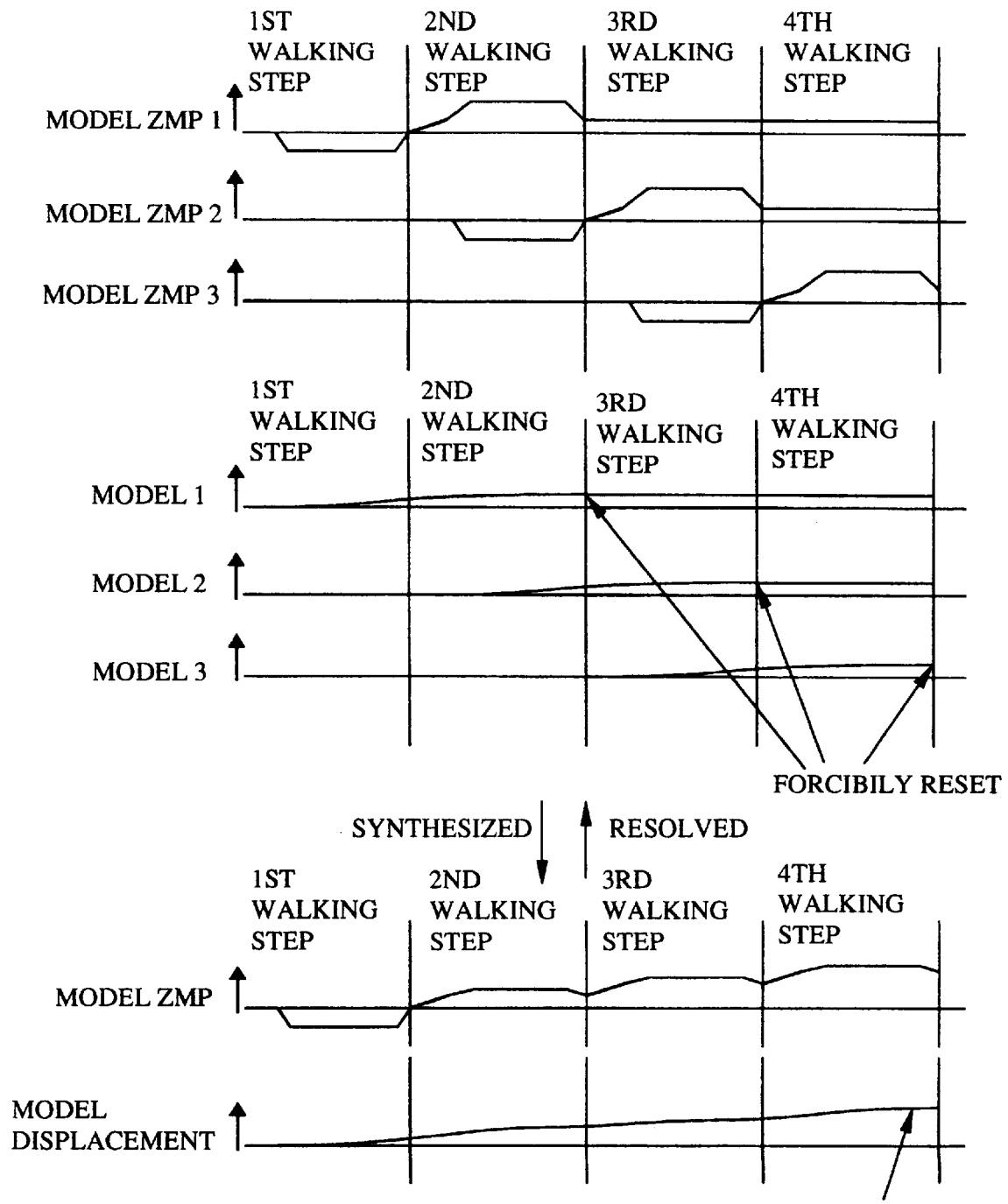
FIG. 31 is a view, similar to FIG. 10, but showing the behavior of the three models illustrated in FIG. 30 to prevent the calculation errors from being accumulated in the system according to the second embodiment of the present invention.

As illustrated in FIG. 31, the behavior of the three models are configured such that model 1 starts walking from the beginning of the first walking step and is forcibly stopped at the end of the second walking step; model 2 is started from the middle of the second walking step and is forcibly stopped at the end of the third walking step; and model 3 starts from the middle of the third walking step and is forcibly stopped at the end of the fourth walking step. The ZMP parameters of the models are determined as illustrated in response to the above-mentioned behavior.

With the arrangement, although the robot behavior, as a whole, is continuous during walking as illustrated at the bottom of FIG. 31, the individual model ZMPs are reset once per every two walking steps. As a result, the calculated value is ideal, resulting in no error accumulation.

In the foregoing embodiments, there is provided a system for generating a gait of a legged mobile robot (1) having at least a body (24) and a plurality of articulated legs (2) each connected to the body through a joint (10, 12, 14R, L), comprising gait generating means (first CPU 80, sets of standard gaits, gait generation method determinator and gait mixer, S10, S30, S32) for generating at least two gaits (1st gait or current gait and 2nd gait or next gait) for a walking step having at least a parameter relating to a displacement of the body and a parameter relating to a floor reaction force acting on the robot (ZMP); discontinuity amount calculating means (first CPU 80, model behavior parameter determinator, S30, S112, S200, S206) for calculating an amount of discontinuity of the displacement and a velocity of the body (Xm, Vm) and the floor reaction force (Dm) at a boundary of the generated gaits, model input determining means (first CPU 80, model behavior parameter determinator, ZMP trajectory generator for model R, L, S30, S112, S208, S210) for determining an input (sum of model ZMPs) to a model (model R, L) designed to approximate a deviation of the displacement and velocity of the body relative to the floor reaction force in response to the amount of discontinuity such that the model behaves to cancel the amount of discontinuity, model output determining means (first CPU 80, S32 to S36, S114, S116) for determining an output (sum of model displacements) from the model in response to the input to the model, and gait correcting means (first CPU 80, S38) for correcting at least one of the gaits in response to the input to the model and the output from the model.

In the system, said gait generating means generates the gaits based at least on standard gaits prepared beforehand. A plurality of the models are provided which behave to cancel the amount of discontinuity at a different walking step. The model is designed as an inverted pendulum model. The system further includes model characteristic storing means (first CPU 80, ROM 84, RAM 74, S14) for storing a characteristic of the output from the model relative to the input to the model, and said model input determining means determines the input to the model based on the stored characteristic. The input to the model is designed such that the model takes a predetermined posture at an end of at least one of the gaits. In the system, said gait correcting means corrects the gait by adding the input to the model (sum of model ZMPs) to the floor reaction force and by adding the output from the model (sum of model displacement) to the displacement of the body and the floor reaction force (sum of model ZMPs). The system further includes joint angle command determining means (first CPU 80, inverse kinematic calculator, S300 to S306, second CUP 82) for determining angle command of the joint in response to the corrected gait. The floor reaction force is described in terms of zero moment point.

It should be noted that, although the conditions of boundary are continuous between two waking steps in the foregoing embodiments as shown in FIG. 10 or 31, the invention is not limited to this configuration. The conditions of boundary can instead be continuous for three walking steps or more. The boundary conditions will be more smooth with a reduced amount of ZMP bias (indicating the height of the model ZMP trapezoid) as the number of walking steps increases. However, the control response to the gait demand would be degraded as the number of walking steps increases. It is also possible to configure the system such that the boundary conditions are continuous by controlling the models to behave and converge to the upright position in infinite time.

It should also be noted that, although the models are configured to stop once per every two walking steps in the foregoing embodiments, the models may alternatively be configured to take a different posture. It is alternatively possible to configure the system such that the models take a predetermined posture once per every three or four or more walking steps. It is still alternatively possible to configure the system such that the models take a predetermined posture gradually within infinite time.

It should further be noted that, although the system is configured in the foregoing embodiments to have two or three models, it is alternatively possible for the system to have four or more models.

It should further be noted that the model trajectories (waveforms) can be stored as tabulated data. More specifically, this can be done by preparing and storing as tabulated data the model trajectories in response to the unit amount of trajectories during two walking steps and similar values in response to a unit of discontinuity at the boundary between the two walking steps. The stored tabulated data based on the unit amount should then be multiplied and synthesize in response to the magnitudes of inputs or the amount of discontinuity. Since the tabulated data can not be modified relative to time, the number or volume of tabulated data will be markedly large if there are many types of division in the standard gaits.

It should further be noted that, although the gait mixing is made based on the technique mentioned in the first embodiment of the aforesaid earlier application, it is alternatively possible to use another technique mentioned in the other embodiment of the application. The approximation technique should not be limited to that disclosed in the present invention. Rather, various modification or alteration is be possible. Furthermore, the gaits need not be mixed with each other.

It should further be noted that, although the gait parameters concerning acceleration (displacement acceleration) are not described in the foregoing embodiments, it is preferable, needless to say, to generate a more smooth gait, if even acceleration is made continuous at the gait boundary. Since, however, the acceleration is proportional to the deviation or difference between the ZMP and the body, the acceleration is not necessarily taken into account.

It should further be noted that, although the present invention is described with reference to a biped robot, the present invention can be applied to other legged mobile robots.

Although the invention has thus been shown and described with reference to specific embodiments, it should be noted that the invention is in no way limited to the details of the described arrangement, but changes and modifications may be made without departing from the scope of the invention, which is defined by the appended claims.

What is claimed is:

1. A system for generating a gait of a legged mobile robot having at least a body and a plurality of articulated legs each connected to the body through a joint, comprising:
   gait generating means for generating at least two gaits having at least a parameter relating to a displacement of the body and a parameter relating to a floor reaction force acting on the robot;
   discontinuity amount calculating means for calculating an amount of discontinuity of the displacement and a velocity of the body and the floor reaction force at a boundary of the generated gaits;
   model input determining means for determining an input to a model designed to approximate a deviation or perturbation of the displacement and velocity of the body relative to the floor reaction force in response to the amount of discontinuity such that the model behaves to cancel the amount of discontinuity;
   model output determining means for determining an output from the model in response to the input to the model;
   gait correcting means for correcting at least one of the gaits in response to the input to the model and the output from the model; and
   joint angle command determining means for determining angle commands of the first and second joints in response to the corrected gaits.

2. A system according to claim 1, wherein said gait generating means generates the gaits based at least on standard gaits prepared beforehand.

3. A system according to claim 1, wherein said model input determining means determines the input based on a reciprocal number of the amount of discontinuity.

4. A system according to claim 1, wherein a plurality of the models are provided which behave to cancel the amount of discontinuity at a different walking step.

5. A system according to claim 1, wherein the model is designed as an inverted pendulum model.

6. A system according to claim 1, further including:
   model characteristic storing means for storing a characteristic of the output from the model relative to the input to the model; and
   said model input determining means determines the input to the model based on the stored characteristic.

7. A system according to claim 1, wherein the input to the model is designed such that the model takes a predetermined posture at an end of at least one of the gaits.

8. A system according to claim 7, wherein the model is designed to stand upright and stop.

9. A system according to claim 1, wherein said gait correcting means corrects the gait by adding the input to the model to the floor reaction force and by adding the output from the model to the displacement of the body and the floor reaction force.

10. A system according to claim 1, wherein the robot is a biped robot.

11. A system for generating a gait of a biped mobile robot having at least a body and two articulated legs each connected to the body through a hip joint and each including a foot connected to its distal end through an ankle joint; comprising:
   gait generating means for generating at least two gaits for a walking step having at least parameters relating to a displacement and a velocity of the body and a parameter relating to a zero moment point indicative of floor reaction force acting on the robot;
   discontinuity amount calculating means for calculating amounts of discontinuity of the displacement and the velocity of the body and the zero moment point at a boundary of the generated gaits;
   model input determining means for determining an input to a model designed to approximate a deviation of the displacement and velocity of the body relative to the zero moment point in response to the amount of the discontinuity such that the model behaves to cancel the amount of discontinuity;
   model output determining means for determining an output from the model in response to the input to the model;
   gait correcting means for correcting at least one of the gaits in response to the input to the model and the output from the model; and
   joint angle command determining means for determining angle commands of the hip and ankle joints in response to the corrected gaits.

12. A system according to claim 11, wherein said gait generating means generates the gaits based at least on standard gaits prepared beforehand.

13. A system according to claim 11, wherein a plurality of the models are provided which behave to cancel the amounts of discontinuity at a different walking step.

14. A system according to claim 13, wherein the models are designed as inverted pendulum models.

15. A system according to claim 13, wherein the models are designed to take a predetermined posture at an end of at least one of the gaits.

16. A system according to claim 15, wherein the models are designed to stand upright and stop.

17. A system according to claim 11, wherein the outputs from the model are parameters relating to the position or displacements of the body and the zero moment point.

18. A system according to claim 11, further including:
model characteristic storing means for storing a characteristic of the output from the model relative to the input to the model; and
said model input determining means determines the input to the model based on the stored characteristic.

19. A system according to claim 11, wherein said gait correcting means corrects the gait by adding the input to the model to the floor reaction force and by adding the output from the model to the displacement of the body and the floor reaction force.

20. A method of generating a gait of a legged mobile robot having at least a body and a plurality of articulated legs each connected to the body through a joint, comprising the steps of:
generating at least two gaits having at least a parameter relating to a displacement of the body and a parameter relating to a floor reaction force acting on the robot;
calculating an amount of discontinuity of the displacement and a velocity of the body and the floor reaction force at a boundary of the generated gaits;
determining an input to a model designed to approximate a deviation or perturbation of the displacement and velocity of the body relative to the floor reaction force in response to the amount of discontinuity such that the model behaves to cancel the amount of discontinuity;
determining an output from the model in response to the input to the model;
correcting at least one of the gaits in response to the input to the model and the output from the model; and
determining angle commands of the first and second joints in response to the corrected gaits.

21. A method according to claim 20, wherein the gait is generated based at least on standard gaits prepared beforehand.

22. A method according to claim 20, wherein the input to the model is determined based on a reciprocal number of the amount of discontinuity.

23. A method according to claim 20, wherein a plurality of the models are provided which behave to cancel the amount of discontinuity at a different walking step.

24. A method according to claim 20, wherein the model is designed as an inverted pendulum model.

25. A method according to claim 20, further including the steps of:
storing a characteristic of the output from the model relative to the input to the model; and
the input to the model is determined based on the stored characteristic.

26. A method according to claim 20, wherein the input to the model is designed such that the model takes a predetermined posture at an end of at least one of the gaits.

27. A method according to claim 26, wherein the model is designed to stand upright and stop.

28. A method according to claim 20, wherein the gait is corrected by adding the input to the model to the floor reaction force and by adding the output from the model to the displacement of the body and the floor reaction force.

29. A method according to claim 20, wherein the robot is a biped robot.

30. A method of generating a gait of a biped mobile robot having at least a body and two articulated legs each connected to the body through a hip joint and each including a foot connected to its distal end through an ankle joint; comprising the steps of:
generating at least two gaits for a walking step having at least parameters relating to a displacement and a velocity of the body and a parameter relating to a zero moment point indicative of floor reaction force acting on the robot;
calculating amounts of discontinuity of the displacement and the velocity of the body and the zero moment point at a boundary of the generated gaits;
determining an input to a model designed to approximate a deviation of the displacement and velocity of the body relative to the zero moment point in response to the amount of the discontinuity such that the model behaves to cancel the amount of discontinuity;
determining an output from the model in response to the input to the model;
correcting at least one of the gaits in response to the input to the model and the output from the model; and
determining angle commands of the hip and ankle joints in response to the corrected gaits.

31. A method according to claim 30, wherein the gait is generated based at least on standard gaits prepared beforehand.

32. A method according to claim 30, wherein a plurality of the models are provided which behave to cancel the amounts of discontinuity at a different walking step.

33. A method according to claim 32, wherein the models are designed as inverted pendulum models.

34. A method according to claim 32, wherein the models are designed to take a predetermined posture at an end of at least one of the gaits.

35. A method according to claim 34, wherein the models are designed to stand upright and stop.

36. A method according to claim 30, wherein the outputs from the model are parameters relating to the position or displacements of the body and the zero moment point.

37. A method according to claim 30, further including the steps of:
storing a characteristic of the output from the model relative to the input to the model; and
the input to the model is determined based on the stored characteristic.

38. A method according to claim 30, wherein the gait is corrected by adding the input to the model to the floor reaction force and by adding the output from the model to the displacement of the body and the floor reaction force.

39. A computer program embodied on a computer-readable medium for generating a gait of a legged mobile robot having at least a body and a plurality of articulated legs each connected to the body through a joint, comprising the steps of:
generating at least two gaits having at least a parameter relating to a displacement of the body and a parameter relating to a floor reaction force acting on the robot;
calculating an amount of discontinuity of the displacement and a velocity of the body and the floor reaction force at a boundary of the generated gaits;
determining an input to a model designed to approximate a deviation or perturbation of the displacement and velocity of the body relative to the floor reaction force in response to the amount of discontinuity such that the model behaves to cancel the amount of discontinuity;

determining an output from the model in response to the input to the model;

correcting at least one of the gaits in response to the input to the model and the output from the model; and determining angle commands of the first and second joints in response to the corrected gaits.

40. A computer program embodied on a computer-readable medium for generating a gait of a biped mobile robot having at least a body and two articulated legs each connected to the body through a hip joint and each including a foot connected to its distal end through an ankle joint; comprising the steps of:

generating at least two gaits for a walking step having at least parameters relating to a displacement and a velocity of the body and a parameter relating to a zero moment point indicative of floor reaction force acting on the robot;

calculating amounts of discontinuity of the displacement and the velocity of the body and the zero moment point at a boundary of the generated gaits;

determining an input to a model designed to approximate a deviation of the displacement and velocity of the body relative to the zero moment point in response to the amount of the discontinuity such that the model behaves to cancel the amount of discontinuity;

determining an output from the model in response to the input to of the model;

correcting at least one of the gaits in response to the input to the model and the output from the model; and determining angle commands of the hip and ankle joints in response to the corrected gaits.

41. A program according to claim 40, wherein the gait is generated based at least on standard gaits prepared beforehand.

42. A program according to claim 40, wherein a plurality of the models are provided which behave to cancel the amounts of discontinuity at a different walking step.

43. A program according to claim 42, wherein the models are designed as inverted pendulum models.

44. A program according to claim 42, wherein the models are designed to take a predetermined posture at an end of at least one of the gaits.

45. A program according to claim 44, wherein the models are designed to stand upright and stop.

46. A program according to claim 40, wherein the outputs from the model are parameters relating to the position or displacements of the body and the zero moment point.

47. A program according to claim 40, further including the steps of:

storing a characteristic of the output from the model relative to the input to the model; and the input to the model is determined based on the stored characteristic.

48. A program according to claim 40, wherein the gait is corrected by adding the input to the model to the floor reaction force and by adding the output from the model to the displacement of the body and the floor reaction force.

* * * * *